(12) United States Patent
Johnson et al.

(10) Patent No.: US 11,750,076 B2
(45) Date of Patent: Sep. 5, 2023

(54) APPARATUS, SYSTEMS, AND METHODS FOR GENERATING FORCE IN ELECTROMAGNETIC SYSTEMS

(71) Applicant: Thomas Alexander Johnson, Evergreen, CO (US)

(72) Inventors: Thomas Alexander Johnson, Evergreen, CO (US); Gary C. Berkowitz, Centennial, CO (US)

(73) Assignee: Thomas Alexander Johnson, Evergreen, CO (US)

( * ) Notice: Subject to any disclaimer, the term of this patent is extended or adjusted under 35 U.S.C. 154(b) by 0 days.

(21) Appl. No.: 17/804,080

(22) Filed: May 25, 2022

(65) Prior Publication Data

US 2022/0286035 A1  Sep. 8, 2022

Related U.S. Application Data

(63) Continuation of application No. 17/492,412, filed on Oct. 1, 2021, now Pat. No. 11,368,080.

(60) Provisional application No. 63/086,737, filed on Oct. 2, 2020.

(51) Int. Cl.
  *H02K 41/03* (2006.01)
  *H02K 41/035* (2006.01)
  *H02K 33/18* (2006.01)

(52) U.S. Cl.
  CPC ......... *H02K 41/0356* (2013.01); *H02K 33/18* (2013.01)

(58) Field of Classification Search
  CPC ...... H02K 33/16; H02K 33/18; H02K 41/031; H02K 41/0356
  See application file for complete search history.

(56) References Cited

U.S. PATENT DOCUMENTS

| | | | |
|---|---|---|---|
| 5,026,681 A | 6/1991 | Hed | |
| 6,639,496 B1 | 10/2003 | van Namen | |
| 2004/0129322 A1 | 7/2004 | Chen | |
| 2004/0187294 A1* | 9/2004 | Inaishi | H02K 3/505 29/598 |
| 2006/0197167 A1 | 9/2006 | Dooley | |
| 2007/0194636 A1 | 8/2007 | Ohashi | |
| 2009/0108129 A1* | 4/2009 | Flatt | H02K 16/00 73/865.9 |

(Continued)

FOREIGN PATENT DOCUMENTS

| | | | | |
|---|---|---|---|---|
| CA | 2341095 A1 * | 10/2001 | | H02K 3/28 |
| JP | 2004050154 | 2/2004 | | |

(Continued)

OTHER PUBLICATIONS

WO-0227902-A1, Kaech, all pages (Year: 2002).*

(Continued)

*Primary Examiner* — Naishadh N Desai
(74) *Attorney, Agent, or Firm* — Klarquist Sparkman, LLP

(57) ABSTRACT

Apparatus, systems, and methods used to produce linear and rotational motion, acceleration, and actuation by the use of mobile ferromagnetic or permanent magnets subjected to asymmetric electromagnetic field distributions are disclosed herein. A variety of exemplary embodiments and applications are described, involving different coil and actuator geometries to include and allow for both stationary and moving magnets, electric fields, and magnetic fields.

13 Claims, 14 Drawing Sheets

(56) References Cited

U.S. PATENT DOCUMENTS

| | | | |
|---|---|---|---|
| 2009/0189464 A1 | 7/2009 | Schilffarth | |
| 2013/0135762 A1* | 5/2013 | Lee | G02B 7/08 |
| | | | 359/824 |

FOREIGN PATENT DOCUMENTS

| | | | | |
|---|---|---|---|---|
| KR | 20080094892 | | 10/2008 | |
| WO | WO-0227902 A1 * | | 4/2002 | ............ H02K 53/00 |
| WO | WO 2005088805 | | 9/2005 | |
| WO | WO-2005088805 A1 * | | 9/2005 | ............... H02K 1/17 |
| WO | WO-2021086470 A1 * | | 5/2021 | ............ F16F 15/315 |

OTHER PUBLICATIONS

WO-2005088805-A1, Rayner, all pages (Year: 2005).*
CA-2341095-A1, Chen, all pages (Year: 2001).*
WO-2021086470-A1, Bica, all pages (Year: 2021).*

Hiemstra, "Design of Moving Magnet Actuators for Large-range Flexure-based Nanopositioning," downloaded from https://www.researchgate.net/publication/325594071, 318 pp. (Jul. 2014).

JClaw Tek "V-gate with Magnetic Neutralization—Final Version," YouTube Video downloaded from https://www.youtube.com/watch?v=YFu6qNX9C1k, 5 pp. (video posted May 8, 2020).

Squatchy, "Multi-coil Solenoids . . . How would they work?" downloaded from https://forum.allaboutcircuits.com/threads/multi-coil-solenoids-how-would-they-work.78760/, 1 p. (document marked Dec. 26, 2012).

Janssen "Making a Coilgun—Part 3: Reconsidering Everything," YouTube Video downloaded from https://youtu.be/Dzulys5DEaw, 5 pp. (video posted Feb. 23, 2020).

Wikipedia, "Zeeman slower," pp. 1-3, downloaded from https://en.wikipedia.org/wiki/Zeeman_slower, on Jan. 12, 2022.

International Search Report and Written Opinion dated Jan. 27, 2022 from International Patent Application No. PCT/US2021/053228, 10 pp.

* cited by examiner

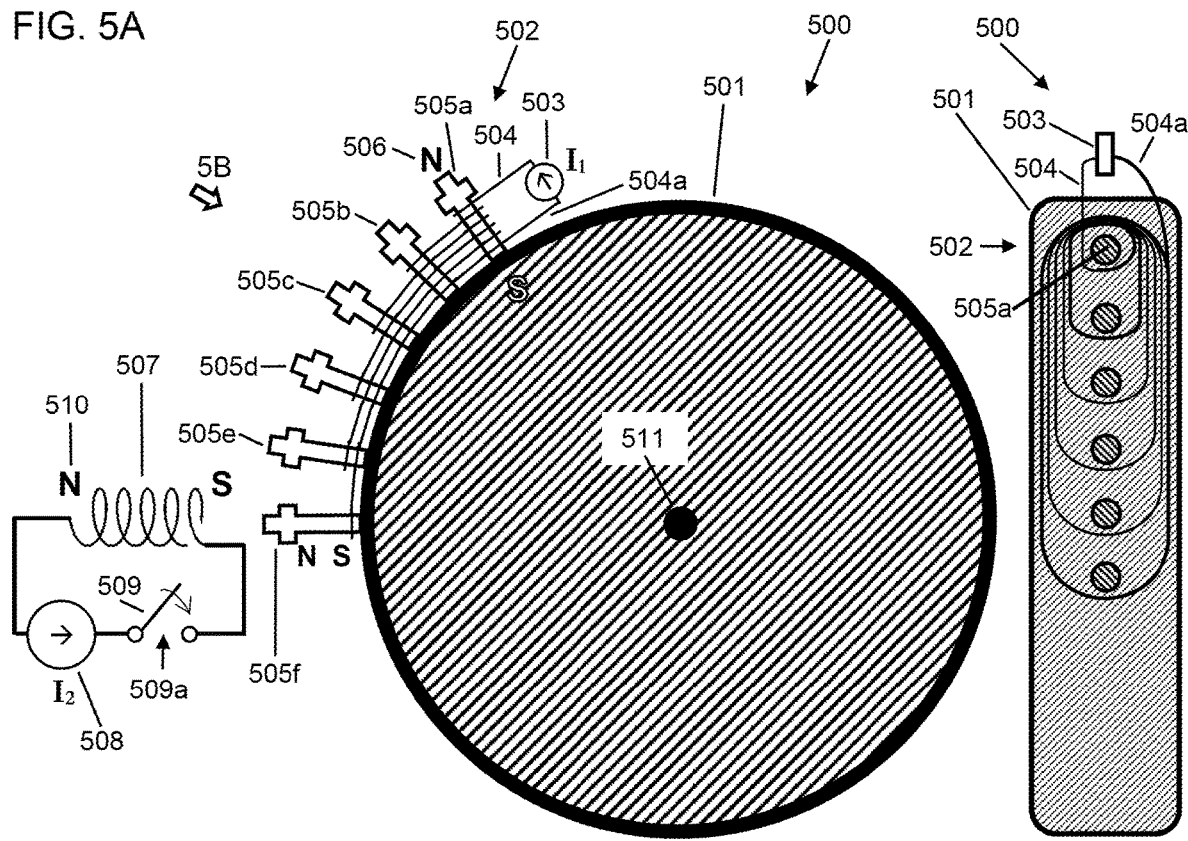
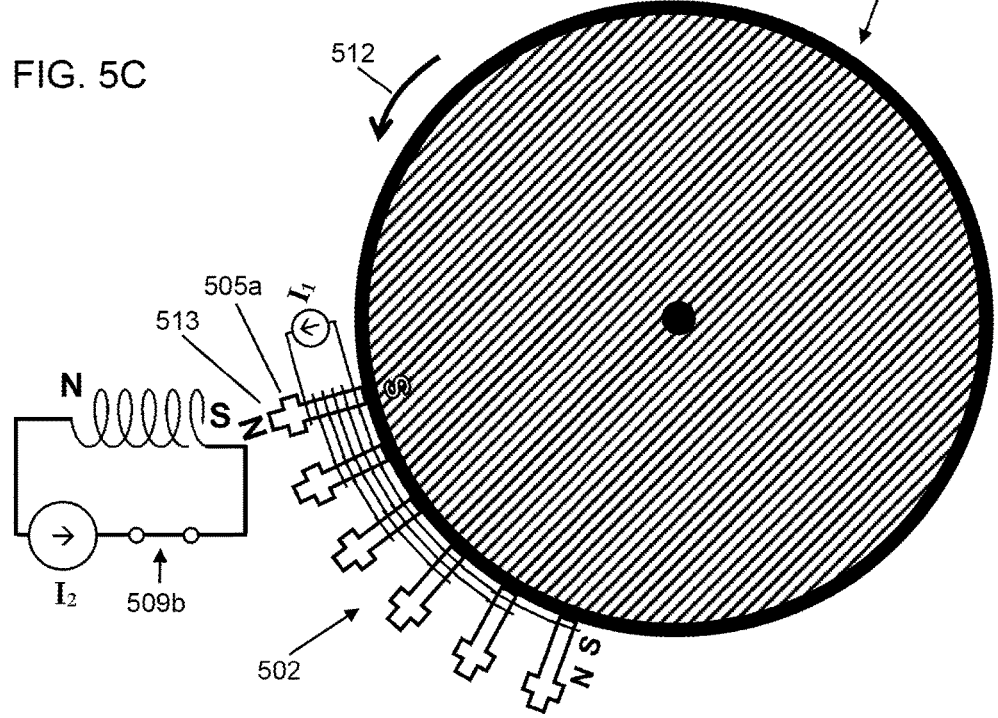
FIG. 5A
FIG. 5B
FIG. 5C

APPARATUS, SYSTEMS, AND METHODS FOR GENERATING FORCE IN ELECTROMAGNETIC SYSTEMS

CROSS REFERENCE TO RELATED APPLICATION

This application is a continuation of U.S. patent application Ser. No. 17/492,412, filed on Oct. 1, 2021, which claims the benefit of U.S. Provisional Patent Application No. 63/086,737, filed on Oct. 2, 2020, both of which are incorporated by reference herein in their entirety. This application is related to PCT Application No. 2021/053228 filed on Oct. 21, 2021, which is also incorporated by reference herein in its entirety.

FIELD

The present disclosure is generally directed to electromagnetic machines, and more specifically to electromagnetic actuators.

BACKGROUND

In a general electromagnetic force-generating system, a current-carrying conductor, which by Oersted's Law generates a magnetic field (given by Biot-Savart), interacts with an external magnetic field, and thus, a force on both the conductor and a source of the external magnetic field is generated. According to well established laws of electrodynamics, this interaction, when asymmetric, produces motion.

For example, in a common solenoid device (such as the solenoid device illustrated in and discussed below with reference to FIGS. 1A and 1B), a rigid magnetic or ferromagnetic (non-permanent) object, commonly termed a plunger or a core (or sometimes, an armature, not to be confused with the use of armature in electrical technology, meaning a framework of coil windings), is suspended near or partly within a cylindrical current-carrying solenoid (which may also be referred to as a coil). The application of current in the coil generates a magnetic force that propels the object along the axis of the coil, always in such a manner as to pull the plunger toward the midpoint of the coil. In this example, the force that is experienced by the plunger is dependent on the position of the plunger along the axis of the solenoid magnetic field. The maximum force on the plunger occurs when one end of the plunger is at the endpoint of the coil (FIG. 1A). The equilibrium point of zero net force occurs when the midpoint of the plunger aligns with the midpoint of the coil (FIG. 1B). This is because, when at the midpoint of the coil, equal and opposite magnetic forces act on the N and S ends of the plunger concurrently. When a non-magnetic extension of the plunger is used to cause an action to take place outside the end of solenoid, the system is commonly referred to as a proportional, axial, or linear actuator. The range of motion, with a maximum range of motion being one-half the length of the plunger, defines a stroke of the solenoid linear actuator.

In existing solenoid linear actuators, the net magnetic force that acts on the object (plunger) in motion, typically a ferromagnetic rod or a permanent magnet, is generally linear along the entire stroke except at the opposing ends of the coil. Thus, as noted above, the maximum stroke is limited to half the coil length. However, linear forces are not always ideal in linear actuator applications. Thus, there is a continuing need for improved linear actuators, including those configured to provide nonlinear forces, and especially those configured for a longer stroke for the same coil length.

SUMMARY

Disclosed herein are apparatus and methods for generating nonlinear force in electromagnetic actuator systems. The apparatus and methods disclosed herein are configured with one or more coils arranged to provide a nonuniform (asymmetric) field distribution, yielding a longer stroke than previously achievable with known solenoid linear actuators. In some embodiments, the disclosed apparatus and methods are directed to linear actuators. In some of those embodiments, the linear actuators are configured to provide nonlinear acceleration.

Such linear actuators (as those described herein) can be used in various applications. For example, the disclosed technology can be used for high-performance, long-stroke linear, and/or rotational actuators. The disclosed linear actuators can also be used, for example, when an application involves either crushing or stretching a target. Often, the forces on the object may be better suited if they are not linear in these cases, as the force required to crush or stretch an object changes over the length of the stroke (i.e., the required force is nonlinear). As yet another example, it may be advantageous to have nonlinear acceleration in situations where the smooth transition of speed of the object in motion is desired, such as in accelerating a passenger train or a car.

As a general overview of the disclosed linear actuators, a ferromagnetic object, after being inserted axially into a current-carrying coil, will experience a force, which projects the ferromagnetic object toward the center of the coil where the forces on the moving ferromagnetic object from each of the poles find equilibrium. It will be appreciated that shorter coils possess a shorter distance to the midpoint than do larger coils, so the stroke is shorter in a shorter coil relative to a larger coil. To increase the stroke without increasing the length of a coil, we add a slightly shorter secondary winding on the outside and towards one end of a primary coil (as illustrated in and discussed below with reference to FIG. 2A). Now a ferromagnetic object can be moved to a slightly displaced position from the center of the coil as the object is brought to equilibrium within the two coils acting on it. The ferromagnetic object therefore can be displaced past the center of the coil, toward the end with the secondary winding. As shorter and shorter coils of increasing radius are added to the periphery of a solenoid, and displaced or offset toward one end thereof, the equilibrium point can be displaced further towards one pole of the innermost solenoid coil (as illustrated in and discussed below with reference to FIG. 2B). There may be a limit to how close the equilibrium and/or the ferromagnetic object can move or shift toward one pole. The objective, however, can be that an object using this system attains the advantage of a much longer range of actuation as compared to known solenoid coil winding geometry.

One exemplary objective of the linear actuators disclosed herein is to generate a longer stroke than previously achievable with a single-coil solenoid actuator of the same length. In effect, the asymmetric layered-coil geometry can create a non-linear magnetic field density along the solenoid, which preponderates towards one end thereof, thus enabling a wider range of motion. Using this kind of system, it may be possible for a magnetic object in motion in a linear actuator to experience a force that propels the magnetic object along the nearly entire length of the coil before it reaches the point at which opposing forces begin to bring the magnetic object to rest (equilibrium). Using multiple coils with differing levels of current such that the force preponderates from one coil to the next can be an alternative way of achieving this effect (as illustrated in and discussed below with reference to FIGS. 3A and 3B). Whichever embodiment the invention takes, so long as the magnetic field distribution is nonuniform, the length of the stroke can be increased over that of a comparable coil possessing a uniform magnetic field distribution. It is advantageous for there to be mechanical stops in the actuator to stop the plunger from going past the limits of the plunger's stroke, so as to always be able to reverse the polarity supplied to the solenoid, thereby reversing the direction of forces on a plunger, which may have been, for example, a permanent magnet that is magnetized throughout its length.

These and other features, aspects, and/or advantages of the present disclosure will become better understood with reference to the following detailed description and the claims. The accompanying drawings, which are incorporated in and constitute a part of this specification, illustrate embodiments of the disclosed technology and, together with the description, explain the principles of the disclosure.

BRIEF DESCRIPTION OF THE DRAWINGS

FIGS. 5A-5C are schematic diagrams of another exemplary embodiment of a linear actuator, wherein the field distribution gradient takes place along a curved route, so as to create a rotational actuator, in accordance with the present disclosure.

DETAILED DESCRIPTION

General Considerations

Figure 1A:
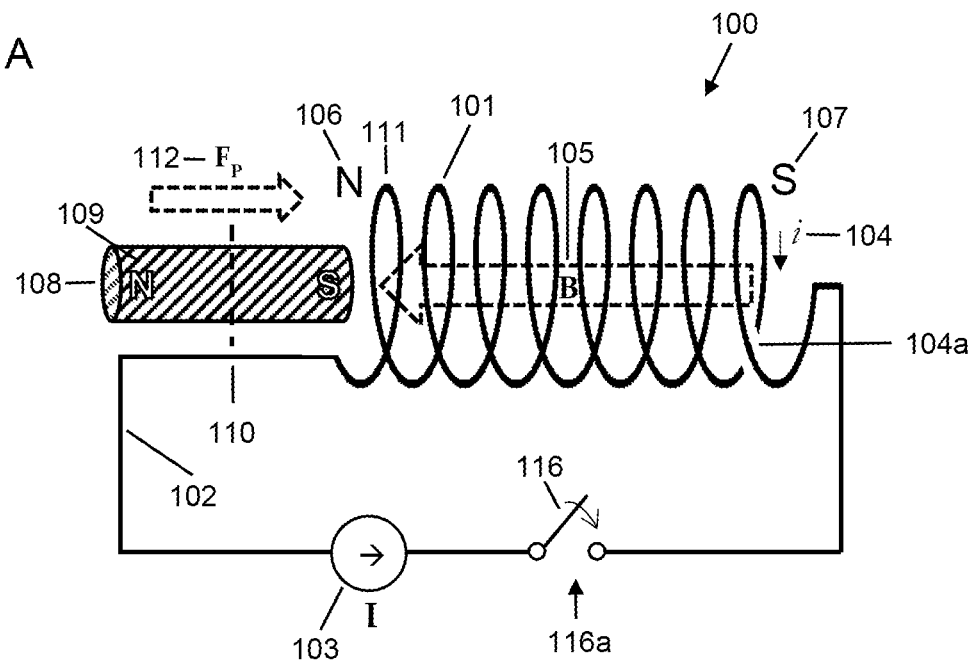
FIGS. 1A and 1B are schematic diagrams of a known solenoid with a single coil and a ferromagnetic plunger in a maximum-force configuration and a zero net force configuration.

The systems and methods described herein, and individual components thereof, should not be construed as being limited to the particular uses or systems described herein in any way. Instead, this disclosure is directed toward all novel and non-obvious features and aspects of the various disclosed embodiments, alone and in various combinations and subcombinations with one another. For example, any features or aspects of the disclosed embodiments can be used in various combinations and subcombinations with one another, as will be recognized by an ordinarily skilled artisan in the relevant field(s) in view of the information disclosed herein. In addition, the disclosed systems, methods, and components thereof are not limited to any specific aspect or feature or combinations thereof, nor do the disclosed things and methods require that any one or more specific advantages be present or problems be solved.

As used in this application, the singular forms "a," "an," and "the" include the plural forms unless the context clearly dictates otherwise. Additionally, the term "includes" means "comprises." Further, the terms "coupled" or "secured" encompass mechanical and chemical couplings, as well as other practical ways of coupling or linking items together, and do not exclude the presence of intermediate elements between the coupled items unless otherwise indicated, such as by referring to elements, or surfaces thereof, being "directly" coupled or secured. Furthermore, as used herein, the term "and/or" means any one item or combination of items in the phrase.

As used herein, the term "exemplary" means serving as a non-limiting example, instance, or illustration. As used herein, the terms "e.g.," and "for example," introduce a list of one or more non-limiting embodiments, examples, instances, and/or illustrations.

As used herein, the terms "non-linear" and "nonhomogeneous" are generally used to describe the irregular shape of the electric or magnetic flux lines when they are produced in a way that varies in intensity from one end of the source of the field to the other.

Although the operations of some of the disclosed methods are described in a particular, sequential order for convenient presentation, this manner of description encompasses rearrangement, unless a particular ordering is required by specific language set forth below. For example, operations described sequentially may in some cases be rearranged or performed concurrently. Moreover, for the sake of simplicity, the attached figures may not depict the various ways in which the disclosed things and methods can be used in conjunction with other things and methods. Additionally, the description sometimes uses terms like "provide" and "produce" to describe the disclosed methods. These terms are high-level descriptions of the actual operations that are performed. The actual operations that correspond to these terms will vary depending on the particular implementation and are readily discernible by one of ordinary skill in the art having the benefit of this disclosure.

As used herein, the terms "attached" and "coupled" generally mean physically connected or linked, which includes items that are directly attached/coupled and items that are attached/coupled with intermediate elements between the attached/coupled items, unless specifically stated to the contrary.

As used herein, the terms "solenoid coil", "solenoid, and "coil" generally refer to the coil winding part of the linear actuator. The term "solenoid actuator" generally refers to the entire actuator as a whole and can distinguish from other forms of linear actuators such as hydraulic, motorized, and pneumatic actuators.

As used herein, the terms "fixedly attached" and "fixedly coupled" refer to two components joined in a manner such that the components may not be readily separated from one another without destroying and/or damaging one or both components. Exemplary modalities of fixed attachment may include joining with permanent adhesive, stitches, welding or other thermal bonding, and/or other joining techniques. In addition, two components may be "fixedly attached" or "fixedly coupled" by virtue of being integrally formed, for example, in a molding process. In contrast, the terms "removably attached" or "removably coupled" refer to two components joined in a manner such that the components can be readily separated from one another to return to their separate, discrete forms without destroying and/or damaging either component. Exemplary modalities of temporary attachment may include mating-type connections, releasable fasteners, removable stitches, and/or other temporary joining techniques.

Unless explained otherwise, all technical and scientific terms used herein have the same meaning as commonly understood to one of ordinary skill in the art to which this disclosure belongs. Although methods and materials similar or equivalent to those described herein can be used in the practice or testing of the present disclosure, suitable methods and materials are described below. The materials, methods, and examples are illustrative only and not intended to be limiting. Other features of the disclosure are apparent from the detailed description, abstract, and drawings.

Exemplary Embodiments

Figure 1B:
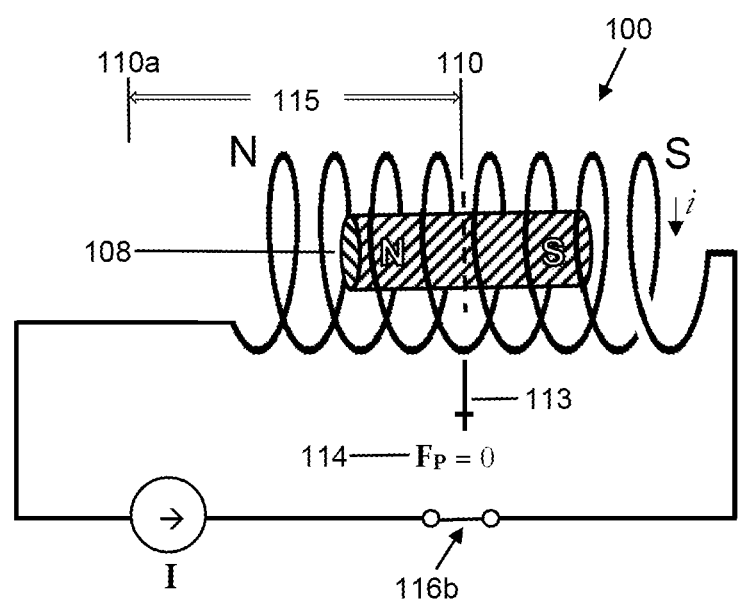

For reference, FIGS. 1A and 1B depict an example of a known solenoid or linear actuator 100. As illustrated therein, the linear actuator 100 includes a coil 101 and a plunger 108, which is a magnet or a magnetized object magnetized through its length with the North Pole 109 of the plunger 108 aiming away from the North Pole 106 of the solenoid. In this position, the plunger 108 experiences a net force 112, which can pull the plunger 108 into the coil 101 due to the magnetic force 105 generated by the current source 103. The direction of the current flow 104 through a circuit 102 and through the windings of the coil 101 determine the polarity of the coil (i.e., the orientation of the North Pole 106 and the South Pole 107). In this case, the plunger 108 is resting within the first turn 111 of the windings of the coil 101. A winding 104a overlaps with another part of the coil in order to illustrate the winding direction of the coil 101. The switch 116 is depicted in the open position 116a to show that there is no current flow through the coil. The mid-point 110 of the plunger 108 is in a position that allows for a force 112 to be exerted upon the plunger when current is flowing.

As discussed above, the shutting of the switch 117 allows for the flow of current to enter the coil 101 which generates a magnetic force that propels the plunger 108 along the axis of the coil, such that the plunger is pulled toward the midpoint of the coil 108. In this example, the force 112 that is experienced by the plunger 108 is dependent on the position of the plunger along the axis of the solenoid's magnetic field. The maximum force on the plunger 108 occurs when one end of the plunger is at the endpoint of the coil 101 (as illustrated in FIG. 1A). The equilibrium point of zero net force occurs when the midpoint 110 of the plunger 108 aligns with the midpoint of the coil 101 (as illustrated in FIG. 1B). This is because, when at the midpoint of the coil 101, equal and opposite magnetic forces act on the N and S ends of the plunger 108 concurrently. A distance 115 corresponds to the stroke of the solenoid actuator which ends at the center of the coil 113, and is defined by an original position 110a the center 110 of the plunger 108 and a final position 113 of the center 110 of the plunger 108. When the plunger is at position 113, the force on the plunger 114 may be very nearly equal to zero.

Figure 2A:
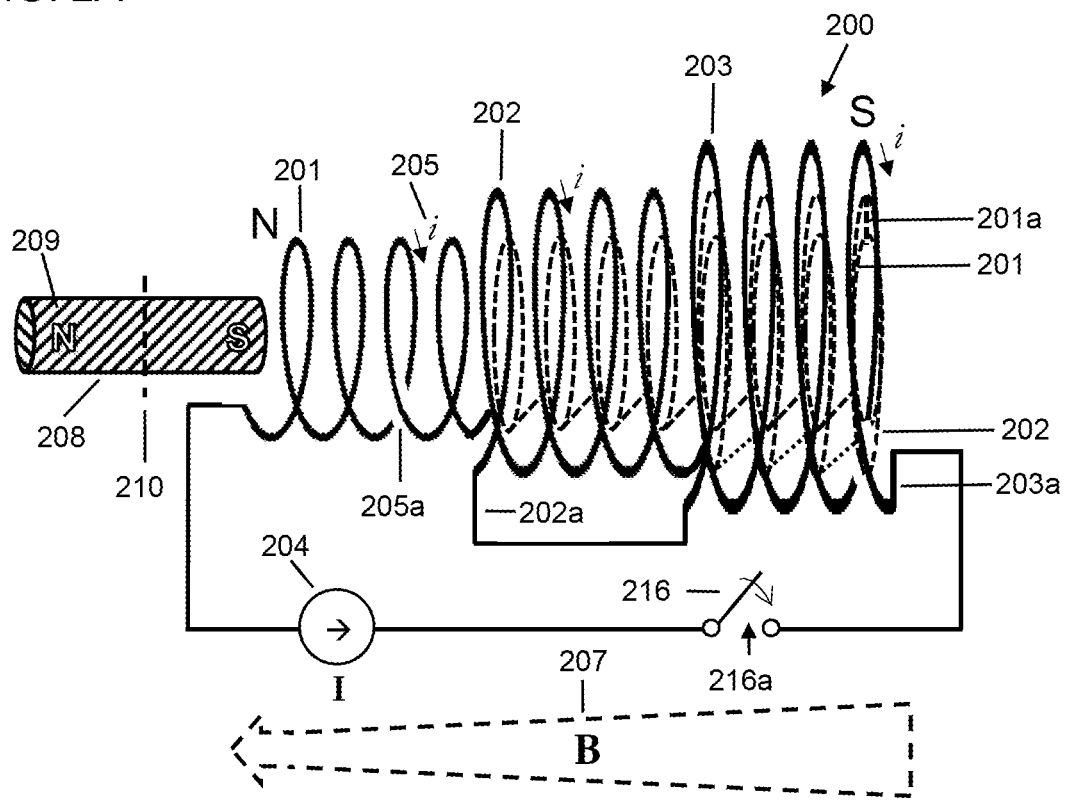
FIGS. 2A and 2B are schematic diagrams of one exemplary embodiment of a linear actuator including a solenoid with a plurality of layered coils displaced toward one end of a primary coil, in accordance with the present disclosure.
Figure 2B:
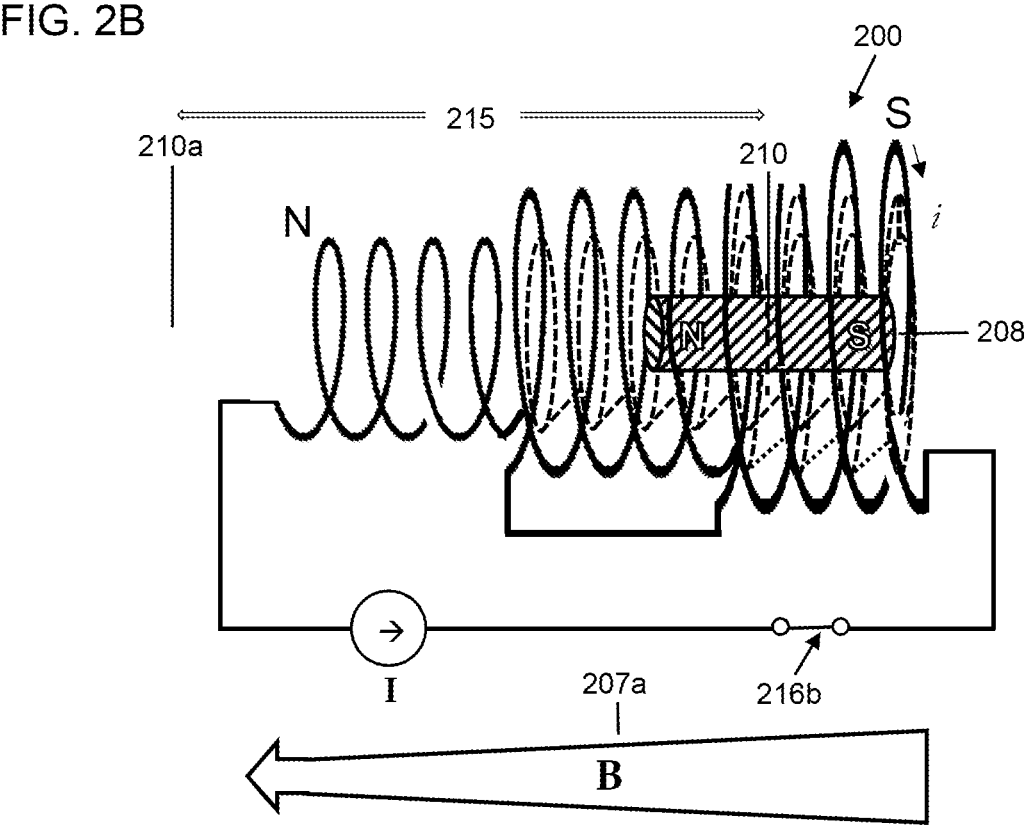

One exemplary embodiment of a solenoid linear actuator 200 according the present disclosure is shown in FIGS. 2A and 2B. As can be seen therein, the solenoid actuator 200 includes a plurality of coils, which have their windings arranged with a geometry that can cause the magnetic force to preponderate towards one pole, and can be configured to act upon a plunger (i.e., magnetized object) 208 along a straight/linear axis of movement. In the present embodiment, the coil geometry includes more windings or coils (coils 201, 202, 203) towards one end of the solenoid actuator 200 relative to the opposing end thereof. It will be understood that the plunger or magnetized object 208 can be a temporary or permanent magnet, a ferromagnetic material, or another electromagnetic coil connected to a source of electricity. It will additionally be understood that the plunger 208 may be positioned on top of the coils, within the coils, or a combination thereof so long as it can be acted upon by the nonlinear magnetic field density to produce a longer stroke of actuation relative to the conventional linear actuator 100 of FIGS. 1A and 1B, where the peak magnetic field density is located in the center of the coil 101 (i.e., at the center of the coil's bounds).

In some embodiments, an elastic band or spring secured to the magnetized object 208 may also be used to create an additional source of force on the plunger 208 in instances or conditions where it is deemed advantageous, such as, for example, in instances in which more linear forces across the stroke are desired. In another example, an additional source of force or tension can allow for the plunger 208 to return to a starting position after it is moved the full stroke of motion if the power is subsequently turned off. This can be advantageous if, for example, an application requires or implements a linear actuator that is designed to be connected to a DC source with no option of reversing the polarity, as this can allow for the plunger in the system to undergo forward movements (due to the magnetic field when the power is turned off) and backward movements (due to the tension acting in the opposing direction when the power is turned off). Furthermore, such embodiments can be advantageous when a variable power source is used in order to overcome the tension partially but not completely, thereby enabling control or alteration the plunger's position along the solenoid coil.

Returning to FIG. 2A, the plunger 208 in the solenoid actuator 100 possesses an asymmetrical magnetic flux density (illustrated by a tapering B-field 207). In this case, the plunger 208 is oriented such that the north pole 209 thereof is facing the opposite direction of the coil (i.e., facing away from the coil). The windings of the coil 201 span from one end (a first end) of the linear actuator 100 to the opposing (second) end of the actuator. At the opposing end, the coil 201 can be connected to where it connects to windings of a second coil 202 via a first connecting wire 201a. The second coil 202 then connects to windings of a third coil 203 via a second connecting wire 202a. The windings of the second coil 202 can be wrapped over a portion of the windings of the first coil 201 so as to produce a magnetic field density that preponderates towards one end (e.g., the right side) of the solenoid actuator 200. The third coil 203 is wrapped over a portion of the windings of the second coil 202 so as to produce a magnetic field density that further preponderates toward one end (e.g., the right side) of the solenoid actuator 200. FIG. 2A specifically illustrates a moment when a switch 219 on an electrical circuit is moving from an open position 216 towards closing, causing current 204 to flow into the solenoid actuator 200 in a specified direction 205. A winding 203a overlaps with another part of the coil in order to illustrate the winding direction of the coil 201.

FIG. 2B illustrates the solenoid actuator 200 after the switch 219 has been moved into a closed position 217. When the switch 219 is in the closed position 217, the plunger 208 moved a stroke of distance 215, which is greater that a stroke distance 115 of the solenoid actuator 100 depicted in FIG. 1B, when the coils 101 and 201 are of equal or similar length. This stroke distance 215 depicted in FIG. 2B illustrates that the midpoint of the plunger 208 moves from an initial position 210a) to a resting position 210, which corresponds closely with the peak magnetic flux density along the coils 201, 202, 203 of the solenoid actuator 200. The potential B field 207 may be generated or manifested when the switch 207 is closed.

When the plunger 208 is held stationary, the coils 201, 202, 203 can experience a force in the solenoid actuator 200 system. When the polarity of one or more of the coils 201, 202, 203 is reversed, the forces created by the action of the reversed coil on the other components in the solenoid actuator can be reversed. The number of the windings in each respective coil 201, 202, 203 and the power flow to each coil 201, 202, 203 may determine the position of the plunger 208 in the solenoid actuator 200. Therefore, the present embodiment can enable variable or adjustable position control of the plunger 208 utilizing e.g., a controller apparatus (such as, the computerized controller apparatus 1410 discussed below with reference to FIG. 14), especially when the coils are powered separately rather than being joined together in one circuit (as in the embodiment of FIG. 6, discussed below). The generated B field 207a produced by the closing of the switch 216b is shown in FIG. 2B.

The construction of coils such as those shown in FIG. 2A and FIG. 2B can be accomplished by altering the graduation in the number of windings of the coil. A graduation of one layer of windings may have at least three fewer (−3) windings than the preceding layer. In other words, the winding count of each consecutive layer can have at least three fewer turns than the previous layer. Each consecutive layer can be displaced towards one end so that the profile of the coil is similar to that shown in FIG. 2A and FIG. 2B, which is to say that the profile of the solenoid shows that the most windings are conglomerated at or distributed toward one end of the solenoid and there are relatively less on the other end. In alternate embodiments, the coils or windings can be with separate spools of wire, each with different turn counts where the higher number of turn counts preponderates toward one end, and which are electrically connected to the next spool of wire in such a way that the profile of the windings takes a form similar to that shown in FIG. 2A and FIG. 2B. The spools of wire may be spaced with minimum distance between them (for example, 1 mm spacing between the spools of wire). As described above, there may be a minimum difference of three turns of windings between each adjacent spool of wire.

It will be appreciated the applying asymmetrical flux density to a linear actuator can enable prediction or control of the plunger's stopping point based on the number of windings in the coils and/or the power flow through their respective circuits. For example, the force on the plunger along the stroke of the solenoid actuator and/or the stopping position of the plunger can be calculated using mathematical analysis allowing further predictability and refinement as one or more parameters in the system (such as, e.g., power flow) are altered. Furthermore, the apparatus and methods disclosed herein for supplying power to a solenoid actuator with variable position control (via controlling differences in the power of the branches of the circuit and the polarity of the coils acting on the plunger) allow for or enable an operator or a control board to perform actions that previously (utilizing convention solenoid actuators) would have required rather complicated controllers including, for example, hydraulic, pneumatic, and/or 3 phase linear motors. Further, conventions solenoid actuators are normally only able to perform a single action (e.g., movement of the plunger in a first direction), and all subsequent actions (e.g., movement of the plunger in an opposing second direction) may require a return spring or other mechanisms to return the plunger to the point of highest force production. The present embodiment depicts one configuration or strategy that can enable full electrical control of the position of the plunger by incorporating an asymmetrical magnetic field density (such as e.g., the tapering B-field 207 shown in FIG. 2A) along the stroke of the plunger.

In some embodiments, an actuator can include a plurality of overlapping coils that may be turned on or off at will. As such, the coils can introduce forces to the system in a nonlinear way, thereby allowing a given apparatus utilizing the actuator to produce multiple force profiles, each of which may tend to center an object or plunger in motion in selected locations and may give rise to different forces acting on the object or plunger. Where a plurality coils are present and actuated individually, various profiles for forces may be available, as depicted in FIG. 6 and discussed below.

Figure 6:
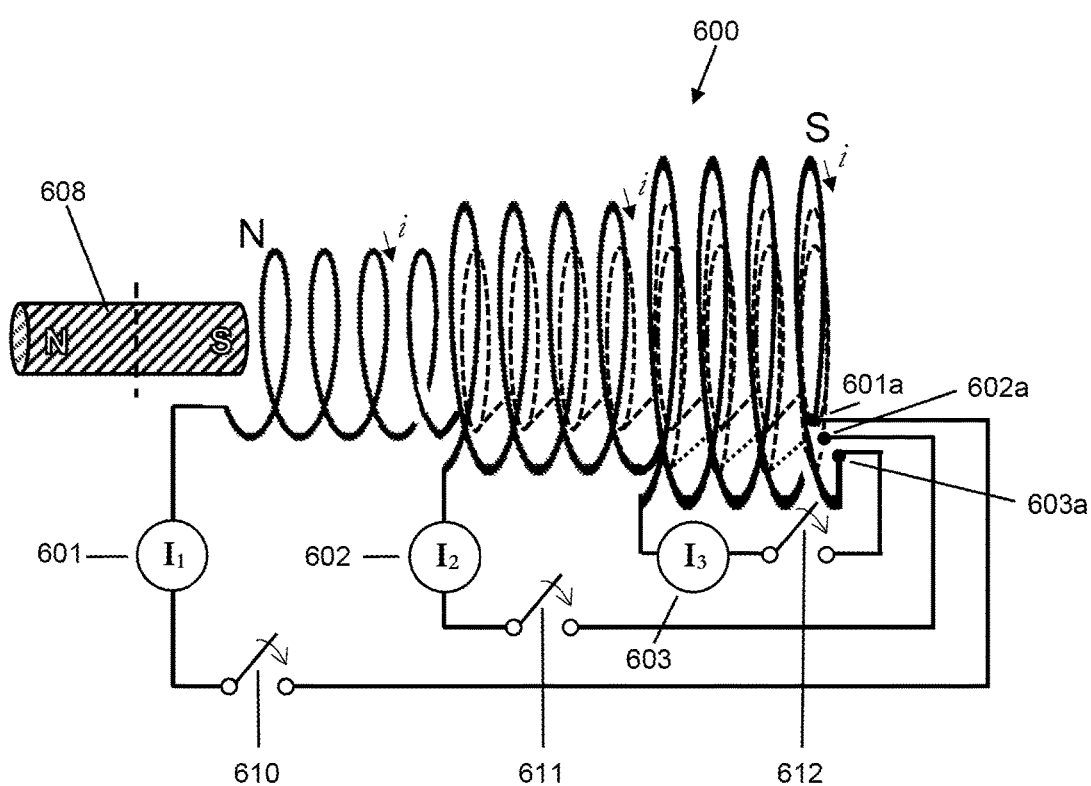
FIG. 6 is a schematic diagram of another exemplary embodiment of a linear actuator, wherein a plurality of separate coils with differing turn counts are used to create the asymmetrical magnetic flux density, in accordance with the present disclosure.

FIG. 6 illustrates another embodiment wherein a solenoid actuator 600 is comprised of coils of differing turn count and diameter in order to aid in the production of the magnetic field asymmetry, which can thereby lengthen the stroke of plunger. Different from the solenoid actuator 600, each of the coils 601a, 602a, 603a in this embodiment is respectively connected to separate power sources on separate circuits 601, 602, 603, which each have a separate power switch 610, 611, 612. The innermost coil 601a stretches the full length of the solenoid actuator 600 and, when turned on in isolation, the coil 601a can draw the plunger 608 to the center point of the coil 601a. A shorter second coil 602a can be wound over the top of a portion or a section of the first coil 601a so that it is displaced or positioned towards one side or end (e.g., a right side) of the actuator 600. A third coil 603a is wound over the second coil 602a and is similarly displaced or positioned toward one side or end (e.g., a right side) of the actuator. When Currents $I_1$, $I_2$, $I_3$ can be respectively applied to each of the coils 601a, 602a, 603a. When the currents $I_1$, $I_2$, $I_3$ are equal and each circuit has power flowing through the coils 601a, 602a, 603a, a magnetic field is generated in a manner that can cause the peak magnetic field density to be displaced from the center of e.g., the coil 601a toward one end of the solenoid actuator, and therefore the plunger 608 can be moved to a position that is closer toward the end of the solenoid actuator relative to a conventional solenoid actuator (such as e.g., the solenoid actuator 100 shown in FIG. 1). Further, if the polarity through one or more of the power sources 601, 602, 603 is reversed, the plunger 608 can come to equilibrium at the opposite end of the solenoid actuator 600.

In additional or alternate embodiments, a solenoid actuator or a linear motor configured to generate a nonuniform magnetic field gradient can include a plurality of co-linear coils fed by different circuits (such as in the embodiment of FIG. 6), wherein a positional sensor can allow for the circuits to switch off as the object passes them so as to reduce a force pulling a plunger in motion backward. Further, the circuits can be controlled (utilizing e.g., a controller apparatus such as, the computerized controller apparatus 1410 discussed below with reference to FIG. 14) to change their polarity in order to resist a backward movement of the plunger under circumstances where it is desirable to do so as, for example, when a weighted object is connected to the plunger and its position is meant to be held constant. In implementations, the coils that are changed to an alternate polarity can be those that are not immediately neighboring the coils that are still acting on the plunger as to limit destructive interference in their respective magnetic fields.

Figure 3A:
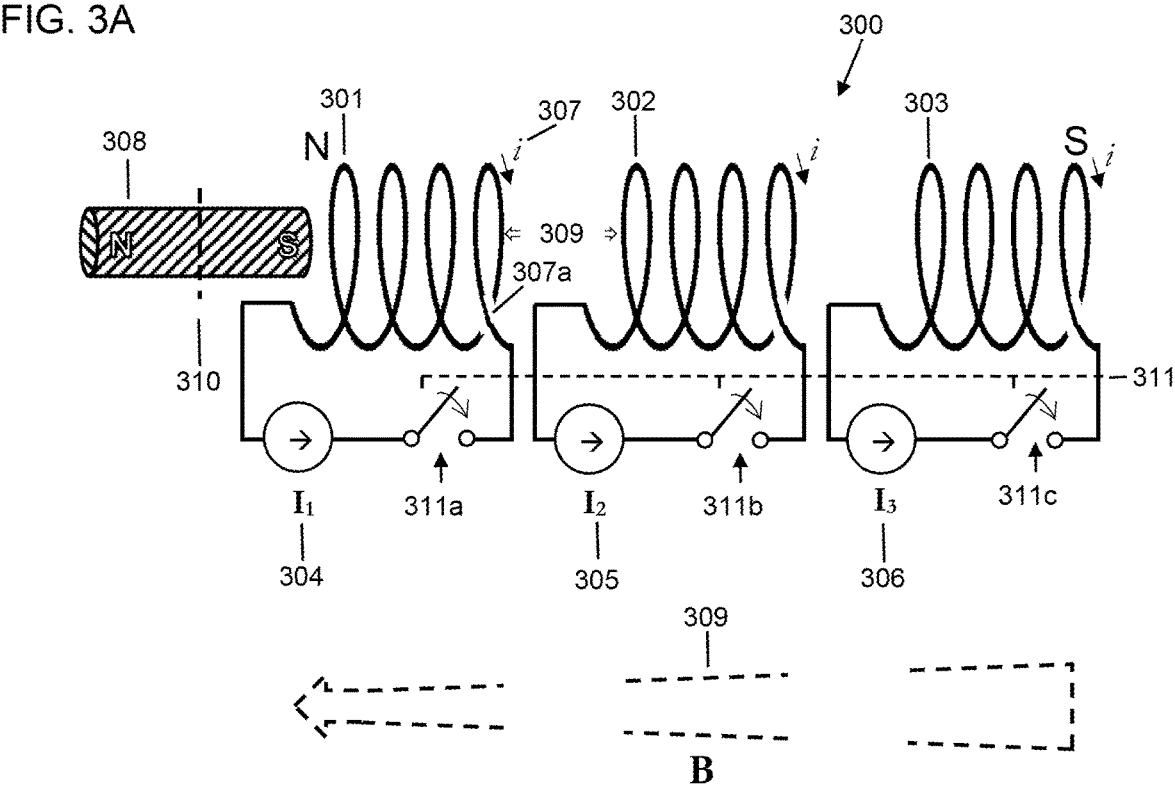
FIGS. 3A and 3B are schematic diagrams of another exemplary embodiment of a linear actuator including a plurality of separate coils arranged in a linear configuration, in accordance with the present disclosure.
Figure 3B:
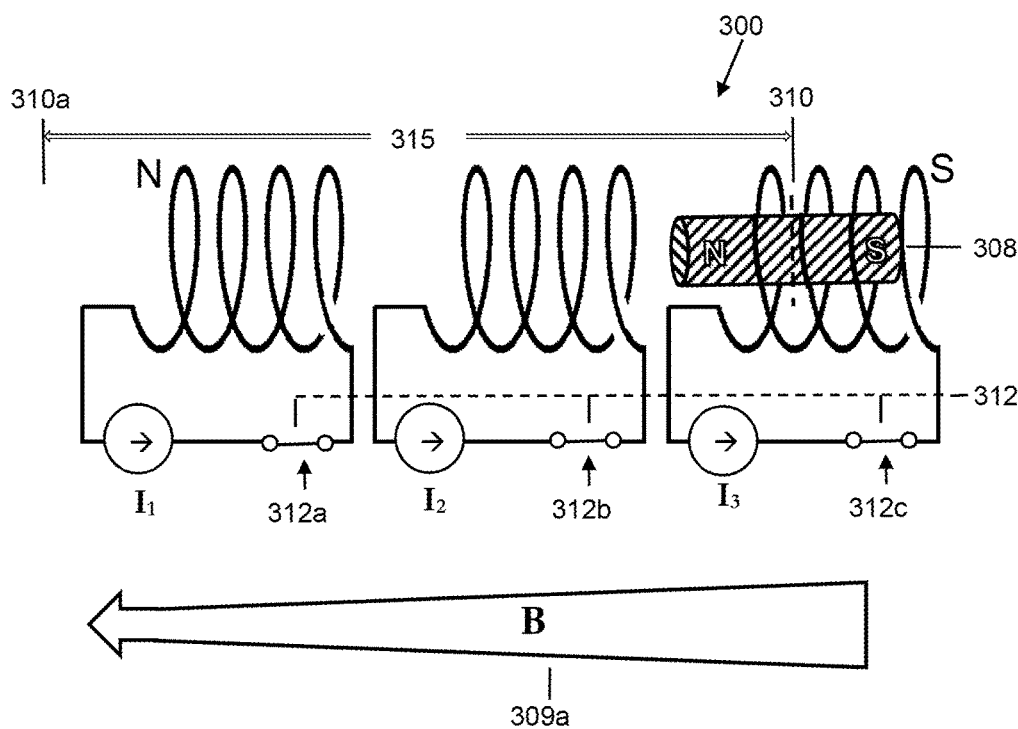

In another exemplary embodiment, a solenoid actuator 300 is shown in FIGS. 3A and 3B. As illustrated therein, the solenoid actuator 300 includes a plurality of coils 301, 302, 303 that are linearly arranged, end-to-end, along a common central axis 309 with a gap disposed between each of the coils. In other words, the solenoid actuator 300 includes multiple non-overlapping coils (the coils 301, 302, 303) arranged along a common axis. In some examples, the coils 301, 302, 303 are in close proximity to each other, for example, being separated by a distance of 1 mm along the linear axis. In some examples, each of the coils 301, 302, 303 can have differing turn counts in the coil and/or differing diameters of the coil, however, in other examples, the coils can have a similar or identical number of turns and/or similar or identical diameters.

As shown in FIGS. 3A and 3B, the coils 301, 302, 303 can each be connected to separate circuits 304, 305, 306 (respectively) such that the current for each coil can be individually controlled and currents $I_1$, $I_2$, $I_3$ may selectively differ between the coils. Flux densities along the common axis 309 can therefore be made discontinuous (i.e., variable) along the axis with a prepondering magnetic flux density biased in order to create the desired direction of movement for a plunger 308 (i.e., biased toward a first end or a second apposing end of the solenoid actuator 300. Due to the close proximity of the coils 301, 302, 303, the magnetic field spans the common axis and the coils 301, 302, 303 can act as a single electromagnet, for example, in a similar manner to the way multiple smaller permanent magnets can be stacked to create a field similar to that of a larger permanent magnet. The power flow to each coil 301, 302, 303 may be altered through the application of pulse width modulation. In FIG. 3A, the switches are in the open position 311a, 311b, 311c, and therefore the potential B field 309 is not yet active.

Using the solenoid actuator 300, the coils 301, 302, 303 arranged along the common axis can be selectively switched on and off in a manner that maintains a force on the plunger 308 in motion by generating, for example, a relatively weak magnetic field at the same position as the plunger and a comparatively stronger magnetic field in front of the plunger as it moves along the axis 309. Additionally or alternatively, in some examples, the magnetic field can be generated such that a repulsive force acts on the moving plunger 308 from behind in order to provide additional accelerative force on the plunger. This may also be effective in reducing the tendency of the plunger when accelerating to slip out of the spot or become misaligned when the plunger is experiencing a maximum accelerative force. Further, a sensor configured to detect a position of the plunger along the axis can be-utilized for proper timing of switching the circuits 304, 305, 306 for the coils 301, 302, 303. By controlling the power flow to each individual coil, it is possible to create a condition of position control along the axis where the plunger is acted on most strongly by the coil with more windings and/or more power relative to others of the coils. In other words, by selectively turning individual ones of the coils 301, 302, 303 on and off, only those coils with active power flow act on the plunger 308, which allows fine tuning of position control utilizing e.g., a controller apparatus (such as, the computerized controller apparatus 1410 discussed below with reference to FIG. 14). It will be appreciated that the coils 301, 302, 303 can act on the plunger 308 while it is disposed within the windings and aligned with the common axis 309 (as depicted in FIGS. 3A and 3B) or the solenoid actuator 300 can function similarly with a plunger that is moving outside of the coils (e.g., along the top of the coil), as long as the plunger (object) is magnetized or capable of being magnetized.

FIG. 3A specifically depicts an embodiment where the plunger 308 is being acted upon by the coils 301, 302, 303 (which are each on a separate circuit) at a moment in which switches 312, 313, 314 on each of the circuits is moving from an open position 311 towards a closed position. The current 307 flows through respective circuits 304, 305, 306 therefore flows through the coils 301, 302, 303. The three coils 301, 302, 303 are separated by a gap 309, and each of can have a differing current levels (for example, such that the current $I_1$ flowing in the circuit 306 is greater than the current $I_2$ flowing in the circuit 305, which is greater than the current $I_3$ flowing in the circuit 304). These differing current levels can generate the asymmetrical flux density 316, which thereby lengthens the stroke of the solenoid actuator 300 relative to convention solenoid actuators, such as the solenoid actuator 100.

FIG. 3B illustrates the solenoid actuator 300 after the switches 312, 313, 314 on the respective circuits 304, 305, 306 are moved into a closed position 312. A position 310a corresponds to a location of the midpoint of the plunger before closing of the switches, while a position 310 corresponds to a location of the midpoint of the plunger 308 after closing of the switches, which define the stroke distance

315. As noted above, the stroke distance 315 is greater than that of a conventional solenoid linear actuator (such as the solenoid actuator 100) by means of the asymmetrical magnetic flux density, which preponderates towards, e.g., the right side of the solenoid actuator 300. A winding 307*a* overlaps with a part of the coil to illustrate a winding direction of the coil 301. The switches are shown in the closed position 312*a*, 312*b*, 312*c* in FIG. 3B, and therefore the active B field 309 is generated and capable of acting on the plunger 308.

It will be understood that three coils and circuits are illustrated in the embodiment of FIGS. 3A and 3B, but in alternate embodiments the solenoid actuator can include more or fewer coils and circuits (such as, two or four or more coils and circuits). Additionally, in embodiments, the circuits may be connected to a circuit controller, for example, or another mechanism for generating different field gradients between respective circuits and therefore differing or creating a gradient in the flux density of the B-field.

In embodiments, the solenoid actuators including multiple coils and circuits (such as in the embodiments of FIGS. 6A and 6B), as well as the associated methods for introducing nonuniform magnetic fields may be made more efficient if the coils, which are behind the plunger, are turned off as the plunger moves past them. In such embodiments, a nonuniform magnetic field can be generated ahead of the plunger via the coils ahead of the plunger, however the fields that the plunger has already moved through are no longer active, so as to yield an even greater stroke of movement for a given coil or set of coils. Where multiple coils are used and switched on and off along a single axis, the coils may actively reduce the power flow as the moving plunger into the field of a given coil. In this way, power levels in each consecutive circuit do not need to continuously increase as the plunger moves along the axis. Rather, the movement of the plunger can continue as long as the power levels of the coil just ahead of the plunger maintains a higher flux than the coil just behind the moving plunger, thereby maintaining a positive flux gradient in the direction of travel. In implementations, the nonuniform field may be oriented in such a way that the axis along which the actuation takes place is in a screw-like form around a cylindrical object. This implementation may allow for more torque to be developed along the central the axis of the cylinder at the expense of actuation length.

In embodiments, for breaking or slowing of the plunger, individual ones of the coils that are located behind the moving plunger can turn on as the plunger moves past them, thereby attracting the plunger in the opposite direction of its momentum and causing the plunger to decelerate or stop its movement. Thus, embodiments disclosed herein can include elements or employ strategies and methods for resistance to motion along the axis of travel of a solenoid actuator configured to generate a non-uniform magnetic field distribution that preponderates toward one end of the actuator. Further, the embodiments disclosed herein can allow for a method of producing movements that act against the resistance for a given power input or time period of power input, which can be advantageous when small or specific changes in the location of the plunger are desired. For example, when the source of resistance is a source of tension or compression between the plunger and a stationary object in the system, which may be fixedly attached, the moving plunger can have a displacement that is relative to the power input or the duration of power input. Further, the plunger can return to a position that minimizes the tension or compression through ordinary elastic means when power to the coils and circuits is turned off. In another example, a load possessing mass or object, against which it would take power to move, may be attached to the plunger. Overcoming the resistive losses of moving the plunger can then take the place of purposefully employed mechanical or elastic resistance (as in the prior example), as the plunger having the mass attached thereto can inherently create its own inertial and mechanical resistance to motion. Diagrammatically this may take the same form as in the embodiments of FIGS. 2A and 2B.

Figure 8A:
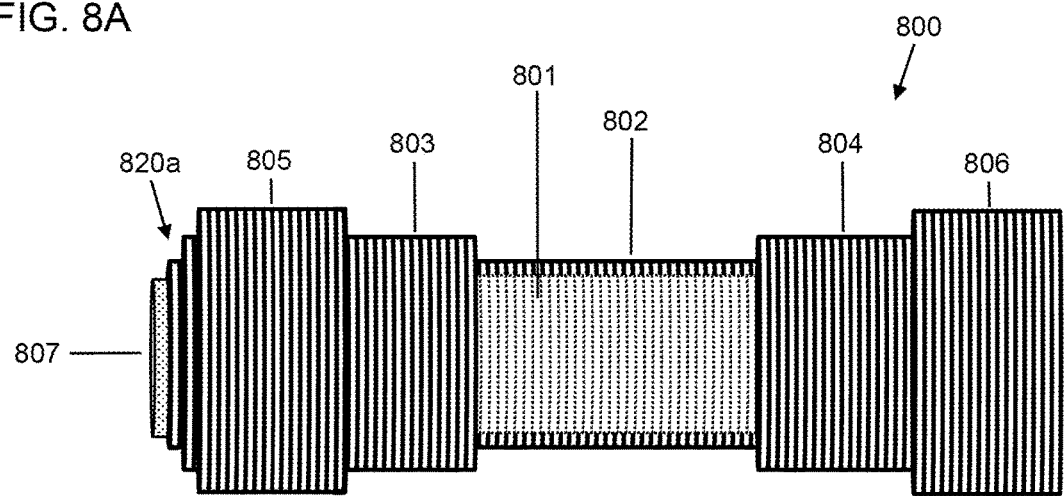
FIGS. 8A and 8B are schematic diagrams of another exemplary embodiment of a linear actuator, wherein two sets of coil geometries are arranged on opposite ends of the actuator axis, each set connected to a separate a voltage source and potentiometer, which is configured to create a push-pull effect, and a maximally variable axial profile of the magnetic flux density, in accordance with the present disclosure.
Figure 8B:
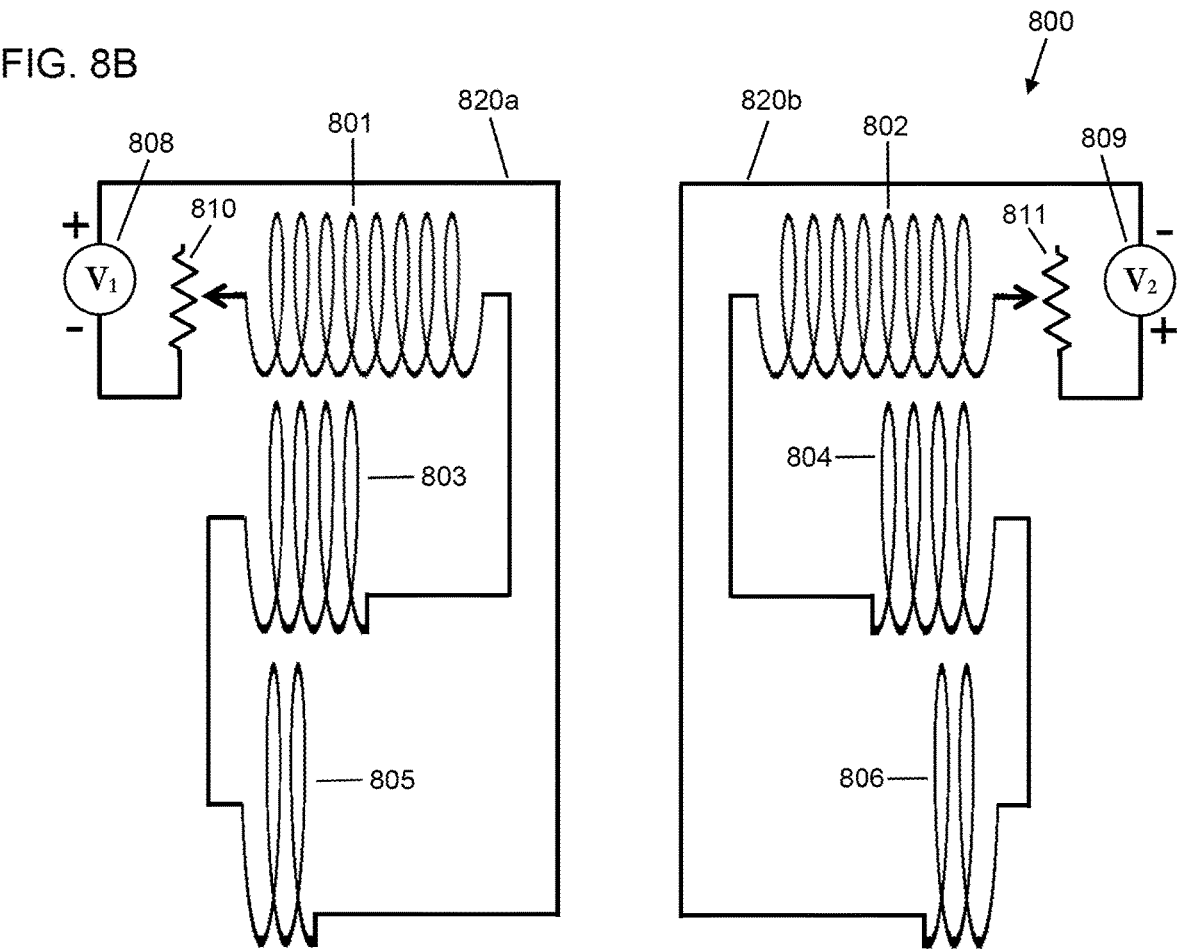

In embodiments, two or more coils in a solenoid actuator (or a linear motor) possessing a non-uniform magnetic field may act to accelerate the plunger in the above examples in opposite directions (by having e.g., opposite polarity of the input power and/or oppositely wound coil directions) so that small changes in the level of power input or time interval of power input to one or more of the coils can cause corresponding changes in the position of the plunger of the actuator or motor. An example of this is illustrated in the embodiments of FIGS. 8A and 8B.

In embodiments, the exemplary solenoid actuators disclosed herein may have any of a moving coil system, a moving magnet system, or a combination thereof within a non-uniform magnetic field distribution that preponderates toward one end actuator. For example, a coil may be of ordinary field distribution or it may be designed to produce a non-uniform magnetic field as it acts on a permanent magnet source in a plunger, which itself produces a non-uniform magnetic field as, for example, the permanent magnet does in the embodiments of FIGS. 7A and 7B. Alternatively, two of such permanent magnets or electromagnetic coils may act on the plunger in the system in a manner that the forces which they produce on the plunger may be opposite (i.e., in a push pull topology, similar to that which may occur in the embodiment of FIG. 8) or the forces may be additive (i.e., acting in the same direction). When one component is held stationary, the other component is made to move towards or away from the point of highest flux density depending on the respective polarities of each. A small coil can, for example, act on a large set of permanent magnets to produce a wide stroke relative to the length of the permanent magnetic plunger moving therein. This stroke can be many times (e.g., 2-5 times) the length of the electromagnetic coil acting on it. In this example, the permanent magnets in the plunger may be arranged or attached such that there is a separation between magnets of various lengths.

Such embodiments can also, for example, enable production of a linear motor capable of continual acceleration of the magnets. When this form of linear motor is carrying a load attached to a plunger, the load and plunger can be accelerated down a series of aligned coils. When the load and plunger reach a desired position, the nonuniform magnetic field gradient can be used to gradually decelerate the plunger in motion by reversing the polarity of the coils acting on the load and plunger. In embodiments, smoother deceleration can be attained using coils that themselves possess a non-uniform magnetic field gradient along their central axis. In embodiments, deceleration can also be attained when coils are turned on at a time so as to attract the peak magnetic field density of the plunger in motion in an opposite direction relative to a current direction of travel. Additionally or alternatively, in embodiments, a repelling action or force on the plunger in motion from a coil ahead of the plunger in its direction of travel. Thus, a method of both acceleration and deceleration may be enabled with this form of linear solenoid actuator or motor. Optionally, the solenoid actuator can further include or be configured for communication with a position feedback mechanism or position sensor(s) and a controller capable of turning power flow on and off to each coil based on a position of the plunger to selectively generate either acceleration or deceleration thereof (such as those discussed below with reference to FIG. 14). In some implementations, positional holding or control can be possible when coils acting on the plunger do not turn off, but instead maintain low a continual power flow. Diagrammatically this set up may take a form similar to the embodiments shown in FIGS. 2A and 2B, where multiple actuators of similar construction may be on a single axis of movement with a spacing of, for example, 1 mm between each respective actuator.

Figure 9:
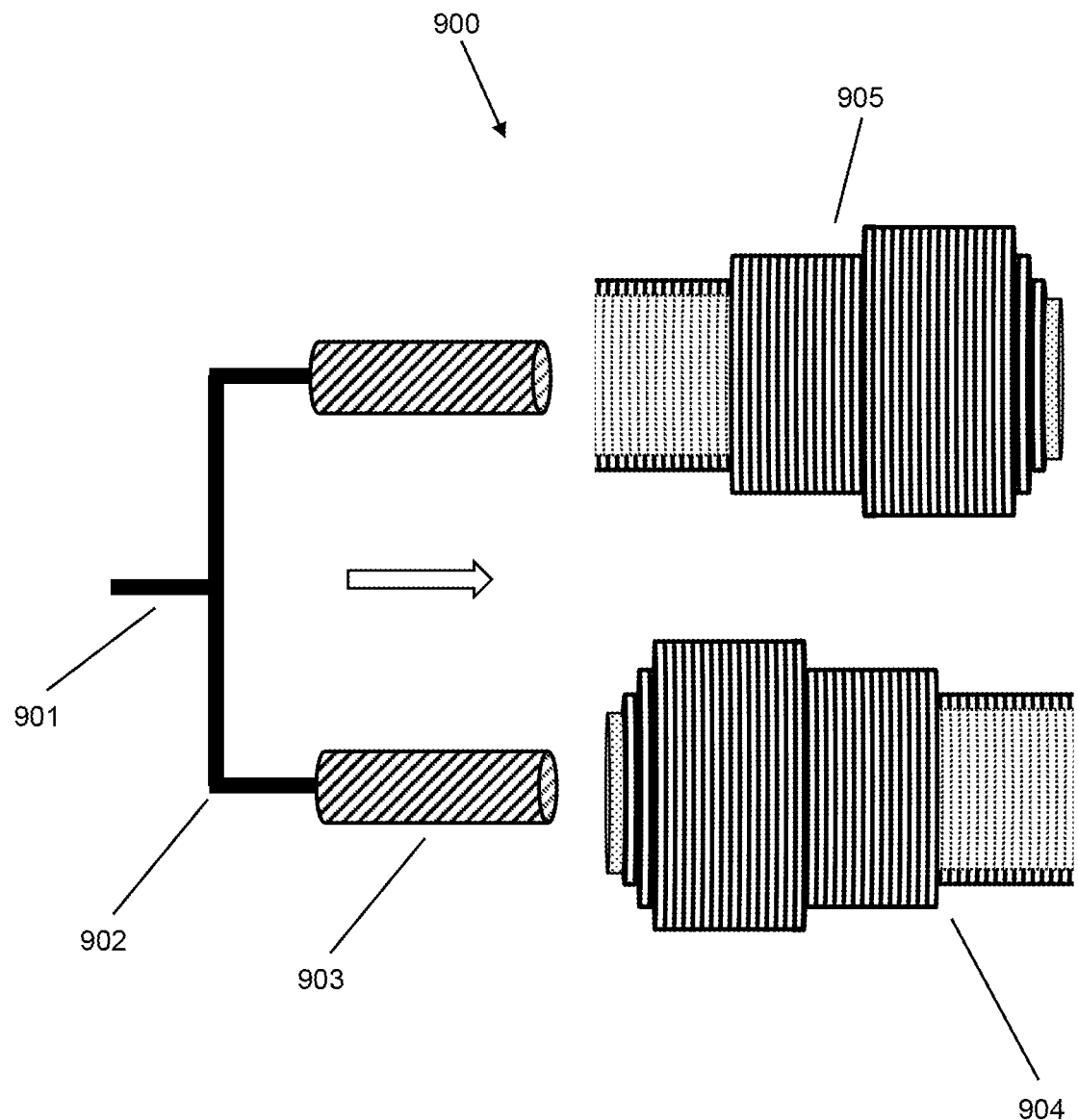
FIG. 9 is a schematic diagram of an exemplary plunger configured for use the exemplary actuator of FIGS. 8A and 8B.

Two or more plungers being acted on by co-linear solenoid actuators or linear motors possessing a nonuniform magnetic field can be connected using a rigid or semi-rigid member, which may result in higher total force production, as illustrated in the embodiment of FIG. 9. The distance between each of the sources of nonuniform magnetic fields driving the solenoid actuators may be such that there is minimal interference in the produced magnetic fields. One or more of the co-linear actuators or motors can be configured for reversal of polarity and include a mechanism for adjusting power flow thereto. This can enable production of counteracting forces on the rigid or semi-rigid member connecting the plungers of the solenoid actuators and allow for various positions along the stroke pathway of the plungers to be reached and held. Specifically, in the exemplary embodiment of FIG. 9, a rigid or semi rigid member 901 splits into two elbows 902 in order to connect two permanent magnets 903 which may act as the plungers in a solenoid actuator 900. Two coils 904 and 905 are constructed to produce a non-homogenous magnetic field which preponderates toward opposite ends, illustrated in that coil 904 is facing the opposite direction relative to coil 905. As power is applied to these two coils 904 and 905 simultaneously, the plungers 903 are both imparted a force which may act in opposite directions. As the average power in each of the coils is altered, the position of the two plungers can be altered or changed. Maximum force in a given direction is achieved when the two coils 904 and 905 are imparting forces on the plungers 903, which are acting in the same direction. Further, any number of coils and plungers may, in this fashion, be connected together with the added benefit of increasing the actuation power. It may be especially advantageous in embodiments or applications where precise control is desired over a wide stroke when, for example, additional solenoid coil(s) and plunger(s) are added to the system which have a displaced position of either the coil or plunger with respect to the other coils and plungers in the system. These additional components may allow for forces to be imparted on the plungers through their connection member (such as, the rigid or semi-rigid member 901) while they are at the end of their stroke where the forces acting on them are otherwise negligible.

In additional or alternate embodiments, a solenoid actuator or a linear motor configured to generate a nonuniform magnetic field gradient can have at least two coils configured for acting in opposite directions with at least one of the coils being connected to a circuit with a mechanism for power mitigation for positional control. Additionally, in embodiments, an on/off switch can be included in each of the circuits connected to the electromagnetic coils for the purpose of selectively turning off the power flow and allowing the other coil(s) of the actuator to take over acting on a plunger. When two or more counter acting coils are used in a solenoid actuator, such switches can permit a full stroke or nearly full stroke of movement in each direction along a linear pathway (via e.g., turning individual circuits off), as well as enable the ability to perform discreet actions of small incremental movements (via e.g., power flow control to the individual circuits controlled by a controller such as, the computerized controller apparatus 1410 discussed below with reference to FIG. 14). An example of this is shown in the embodiment of FIGS. 8A and 8B.

In additional or alternate embodiments, an electromagnetic spring can be formed when a coil has a larger number of windings at each end thereof. Such coil geometry can create a bipolar non-uniform magnetic field, which can have a stronger magnetic force acting on a plunger as it strays from the midpoint of the coil. When at either of the end points, the plunger in motion (which may be a magnetic, ferromagnetic, or electromagnetic object) can be forced to change directions. The plunger may experience forces that arrest its momentum and then return the plunger to the midpoint. Mounting forces towards the ends of the coil in the solenoid actuator can allow for this to be done in a more effective manner relative to a conventional solenoid actuator. Not only can the plunger experience a returning force that draws it toward the midpoint of the coil from the magnetic equilibrium that exists there, but the plunger can also be acted on by the nonuniform magnetic field, which itself can cause motion in electromagnetic systems. It will be appreciated that similar result can be achieved via an actuator embodiment including multiple coils aligned on a similar axis (such as the solenoid actuator 300 illustrated in FIGS. 3A and 3B) when a greater current density is applied to the coils at opposing ends of the plurality of coils. An exemplary embodiment of this may be nearly identical to the embodiment of FIGS. 8A and 8B except that the two circuits may be joined by one power source such that the field produced by both sets of coils is additive.

As discussed above, in embodiments, a coil can have one or more adjacent coils, which also have power flowing therethrough, which can, by applying differing the power levels to the coils, alter their respective influences on a plunger (e.g., a magnetic or paramagnetic object or objects). However, in alternate embodiments, a more potentially more cost-effective method of controlling the position of a plunger in a solenoid actuator or a linear motor having a plurality of coils can be configured to have an increasing number of windings and/or coils toward one end of the solenoid actuator or increasing power flow toward one end of the solenoid actuator. In such embodiments, variable power sources such as, for example, a battery and a potentiometer, can cause a plunger in the system to have a varying amount of attractive or repulsive force, which can drive movement to a new location. Automated control of the solenoid actuator can be made, for example, by attaching a motor to the potentiometer and driving the motor from a computerized controller (such as, the computerized controller apparatus 1410 discussed below with reference to FIG. 14) capable of causing incremental changes in a position of the motor. In implementations, separate batteries of different power ratings can be connected to the circuit(s) with switches, which may be controlled using the computerized controller. It will be understood that other types of variable power supplies and methods such as pulse width modulation can be used in combination with the actuators disclosed herein, and the disclosure is not limited to the above examples. An example of this type of actuator is illustrated in the embodiment of FIGS. 8A and 8B.

In embodiments, in order to add non-linearity to the magnetic flux distribution, the material of the coil's core may be altered. A core of a coil can contain a material that increases inductance of the coil. The material can be used to influence the inductance of some windings in a coil more than others. For example, when a solenoid actuator comprising nonuniform magnetic fields along the stroke is comprised of two or more electromagnetic coils acting on one another, it may be desirable for the coils to be similar in configuration to coils in a conventional solenoid actuator, but to include a core composition in a section of the windings including a material (which may, for example, be ferromagnetic) in order to increase the inductance of some windings relative to others of the windings. For example, the coil can be configured to have more of the inductive material in windings at one end of the coil relative to the windings at the opposing end of the coil. Such a configuration can increase the non-linearity towards one side of the coil (i.e., a side of the coil having the inductive core) in order to increase the stroke length of the coil.

Figure 10:
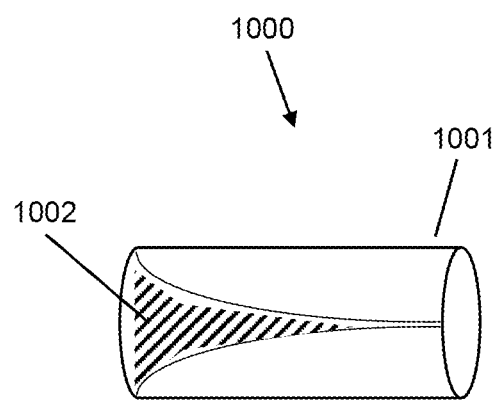
FIG. 10 is a schematic diagram of an exemplary coil core that can be utilized in combination with the exemplary actuators disclosed herein.

In an illustrative example, a cylindrical dowel that can be hollowed out in a manner that leaves more volume on one end with relative to the opposing end. The hollowed space can be filled with a material that is capable of influencing the inductance of the nearby windings such as, for example, ferrite powder. A coil can then be wound on top of the dowel. The coil can thereby be configured to maintain an asymmetrical flux density along its length without the use of different coil geometries or multiple circuits. In embodiments, primary coils with cores having such a configuration can have separate, secondary coils moving outside of them (such as, on the top of the primary coils) while the primary coils are held stationary. Such coils may also produce a magnetic field with asymmetrical flux density in other to further increase the stroke distance of the solenoid actuator. Further, in embodiments, coils and/or magnets that may or may not produce flux densities that vary over their lengths can be acted on by another coil or magnet, which itself produces a non-uniform magnetic field density in order to increase the stroke of movement of an object (a plunger) in motion through a solenoid actuator. For example, as depicted in FIG. 10, a cylindrical coil core 1001 has a portion 1002 of its that is volume hollowed out and filled with a material of a different magnetic permeability than the rest of the core (illustrated in cross hatching). The whole core 1000 can then be utilized to wind a coil over. In embodiments, the coil can then produce a nonhomogeneous magnetic field due to the magnetic permeability changing over the length of the cylinder 1000. This magnetic field may then be acted on by a permanent magnet, which may be ring-shaped so as to travel along the length of the coil that is wrapped on the core 1000. The coil and core may also be the plunger in an actuator system when the other source of a magnetic field acting on it is held stationary. Accordingly, a coil wrapped upon a core such as this acts in many ways like the magnetic field produced from other embodiments such as that depicted in FIG. 2A.

Figure 11:
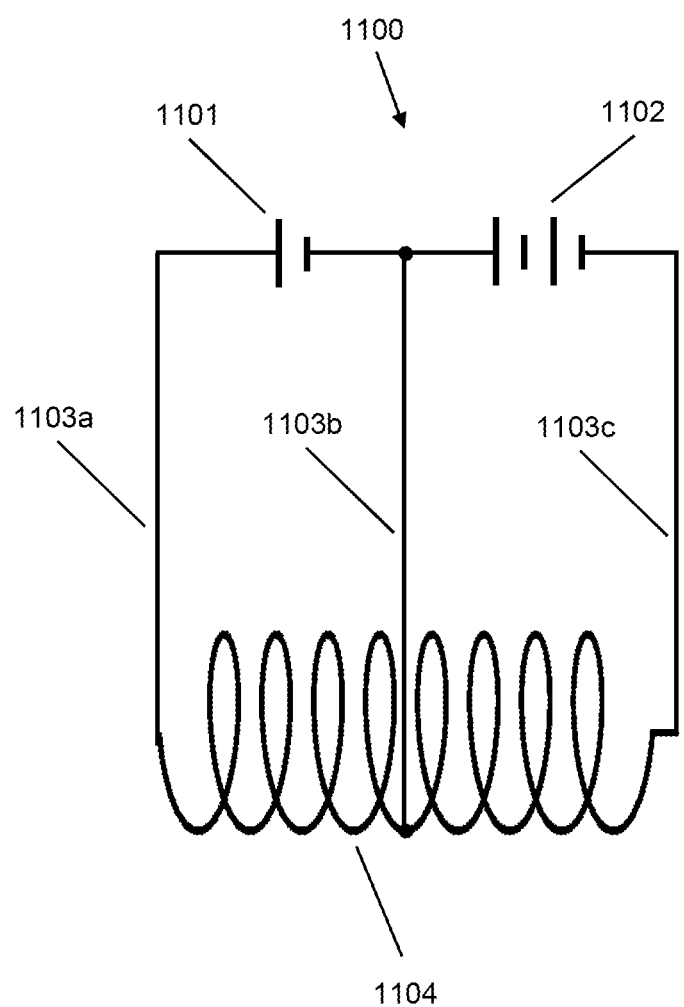
FIG. 11 is a schematic diagram of another exemplary embodiment of a linear actuator, in accordance with the present disclosure.

In another embodiment, a solenoid actuator can have multiple taps along its length similar to an autotransformer. The foregoing solenoid actuator can be configured for use with a power source and a controller (such as, the computerized controller apparatus 1410 discussed below with reference to FIG. 14) to create non-uniform magnetic fields for the purpose of increasing the stroke in one or more coils of the solenoid actuator. A first end of a coil may be connected to the negative terminal of a first battery, and a second opposing end of the coil can be connected to the positive terminal of the first battery so that the battery supplies power to the length of the coil. A first tap that is, for example, one third of the way down the length of the coil from the first, can be connected to a positive terminal of a second battery, and the negative terminal of the second battery can be connected to the negative terminal of the first battery. Accordingly, the second battery provides power flow through the corresponding one third of the coil, which is in addition to the power flow therein provided by the first battery. A second tap may be, for example, two thirds of the way down the coil from the first end. The second tap can be connected to a positive terminal of a third battery. A negative terminal of the third battery can be connected to the same terminal that the other batteries are grounded through, therefore the third battery's power flow is contained within two thirds of the solenoid length. This embodiment of a solenoid actuator can therefore comprise three distinct current flows over the coil as each of the three batteries operates in a commensurate fashion over a respective portion of the coil across which it is connected. In this exemplary embodiment, a single layer coil can be configured to generate a non-uniform magnetic field distribution using a power source (e.g., three batteries). In some implementations, additional switches can be configured to switch the polarity of each of the batteries so as to reverse the forces in the system acting on a plunger. Further, in additional or alternate implementations, by incorporating methods of controlling the power flow out of each battery (such as, via a connection through a potentiometer and another on/off switch), fine tuning of the plunger's position may be possible. For example, FIG. 11 illustrated a solenoid actuator 1100 that possesses of a coil with a construction very similar to that of an autotransformer except that it can be configured to produce a nonhomogeneous magnetic field along its length. The coil 1104 can have multiple taps along its length 1103a, 1103b, and 1103c between which power is distributed in a non-linear fashion. The power sources 1101 and 1102 can have different numbers of power cells that are configured to cause more power to flow between taps 1103b and 1103c than there is power flowing between 1103a and 1103b. This produces a magnetic field density that varies along the length of the coil 1104. In alternate embodiments, a greater number of taps can allow for a finer adjustment of the magnetic field density gradient which exists along the length of this coil. Variable power sources which alter the average power through a given section can provide a mechanism to alter a plunger's position within the coil, especially when the plungers position is being monitored and/or controlled via a controller (such as, the computerized controller apparatus 1410 discussed below with reference to FIG. 14), and where data is used to control or vary the average power through the various taps on the coil 1104.

Furthermore, in additional or alternate implementations, the foregoing embodiment of a solenoid actuator can include a core within the coil that is configured to enable a changing or variable magnetic permeability and/or distance from the coil to the core along the length of the coil. This can allow for a single coil to create an asymmetrical magnetic field density on a surface of the coil by augmenting the influence of the core to the coil's inductance at various points along the length of the coil. A plunger can therefore move over the surface of the coil (e.g., over the top of the coil) in a similar manner to the motion of the plunger in other embodiments, wherein the plunger experiences a force that drives it towards or away from the point of highest magnetic flux density, depending on the polarities of the plunger and the coil. The asymmetry in this example may also increase the stroke of the solenoid actuator so long as the inductance preponderates from one end of the coil to the opposing end.

Such an embodiment can be useful in applications where a plunger moves over the top of a solenoid since the coil may be linearly wound and have one circuit, which therefore enables the distance between the plunger and the coil to be minimized and the simplifies the construction of the solenoid actuator.

Figure 4A:
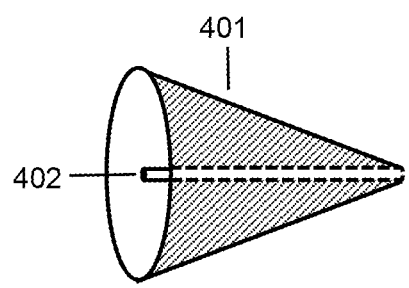
FIGS. 4A and 4B are schematic diagrams of another exemplary embodiment of a linear actuator, wherein the use of nonuniform electric fields generates asymmetric electromagnetic forces that tend to attract the actuating plunger towards the point of highest electric potential, in accordance with the present disclosure.
Figure 4B:
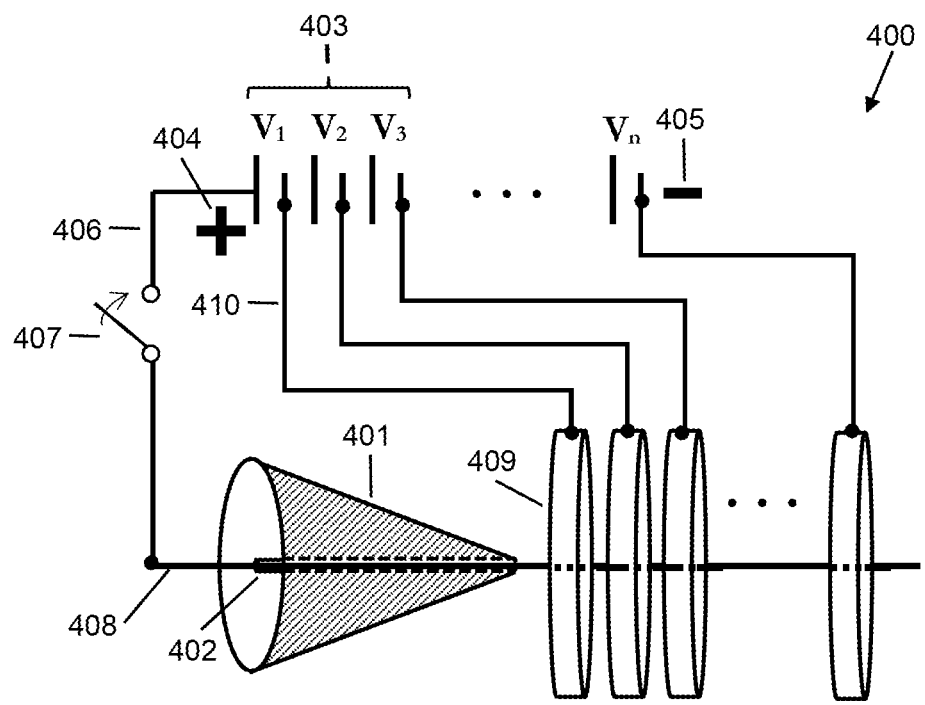

Turning now to FIGS. 4A and 4B, a linear actuator 400 including a conical object 401) is depicted therein. As shown in FIG. 4A, the conical object 410 is can be comprised of metal and can include a hollow metal tube 402 disposed therein and aligned with a central axis of the cone. FIG. 4B depicts the conical object 401 as it slides along in contact with an electrified rail 408 towards a plurality of insulated electrified rings 409, which can have an opposite electric polarity relative to the conical object 401. The insulated electrified rings 409 can be connected to a voltage source 403 in a manner that enables each ring to have a different voltage potential. The voltage potentials may be dependent on, for example, a number of batteries (e.g., batteries $V_1$-$V_n$) connected to the linear actuator 400 and/or their respective properties. A non-uniform magnetic or electrical field can be generated when the rings 403 create a non-linear function of forces based on, for example, their respective voltage potentials and/or their distances to the conical object 401 as it moves along the rail 408. A capacitive nature or relationship may exist between the rings 403 so that as the conical object 401 approaches them, arcing is limited and a difference in electrical potential exists between the respective ring 403 and the conical object 401. The electrical potential is positive on one side 404 of the power source and negative on the other (opposing) side 405 when a DC power source such as a battery is used. A circuit 406 can be formed when motion results in closing of a switch 407. Such motion can be a result of the nonuniform fields generated by the conical shape of the conical object 401 and its attraction to the insulated rings 403. Energy is, in this exemplary embodiment, can be drawn from the batteries and can be consumed via a capacitor with an imbalance of forces acting upon it due to the conical shape of the conical object 401. Motion energy can be further aided by the use of high voltage sources of electric potential.

Figure 12:
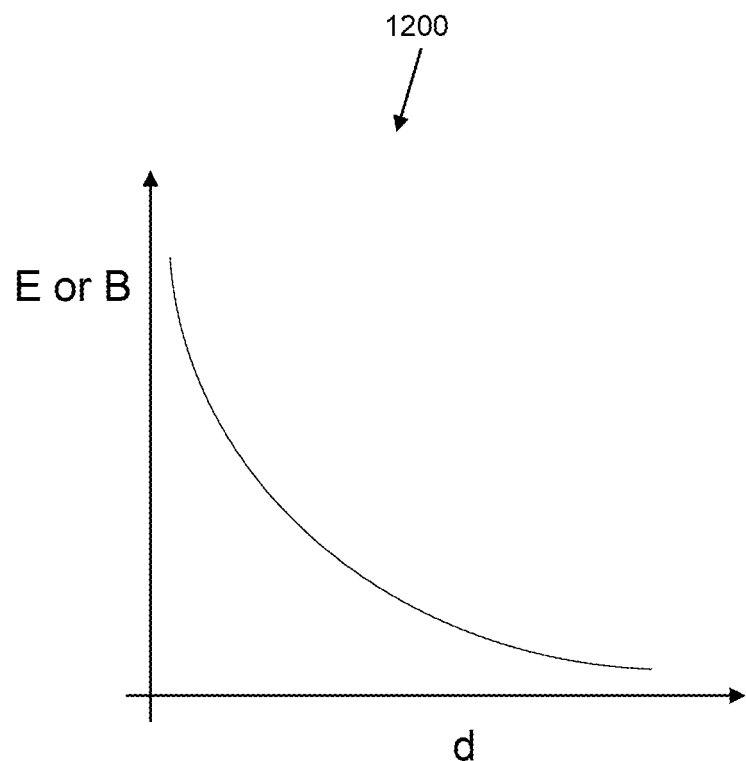
FIG. 12 is a curve illustrating an exemplary inverse square function of the force (or the magnetic field intensity) with respect to distance of an actuator which has a corresponding coil geometry, in accordance with the present disclosure.

In one exemplary application, an object that is intended to accelerate incrementally, such as a linear actuator moving a delicate object where sudden changes in the forces create impulses which are undesirable, can be implemented using a configuration similar to the linear actuator 400 (or configurations similar to other linear actuators disclosed herein), as force therein may be a product of factors such as the field density and the current at a given point along the stroke. As these factors can be made to vary with an asymmetrical distribution, naturally incrementing speeds are possible. The acceleration curves of objects in the system can be tailored to the application, for example, an inverse square curve can be utilized and efficient results. An exemplary curve 1200 is depicted in FIG. 12 where either the electric or magnetic fields (depending on the embodiment) are varied with respect to distance by the inverse square function.

In another exemplary application, objects that are in rotation or pivoting around a joint can utilize asymmetrical field distributions along the stroke for the purpose of increasing the stroke (discussed in detail below with reference to FIGS. 5A and 5B). In this example, asymmetrical distributions of magnetic field density or current density of the stator, rotor, or both can result in motion of an object. Unlike convention actuators, the exemplary applicant can exclude motors and/or gears and instead use solenoid interaction, which may enable simpler and/or less expensive manufacturing. For example, in a rotating joint with a direct current application, the motion can cease when the coil(s) with the highest flux density acting on a system with non-constant flux distribution of the object in motion aligns with the point of highest flux density on a stationary portion of the system. The embodiment can also be applied to a motor if the stationary portion of the system, namely a coil acting on the system, is pulsed or switched off incrementally (for example, from a commutated connection like a commutated DC motor) when the point of highest flux density of the stationary and moving portions of the system align. As the alignment of the stationary and moving portions of the system can ordinarily cause the cessation of movement, a constant rotation can be produced by turning the coils off during this part of the rotation. In implementations, the rotating member may have springs attached to return the object in motion back to a previous (e.g., initial) position when the power level is changed, thereby enabling an object to rotate up to nearly one revolution before stopping when it is exposed to a nearby magnetic field. In rotating actuator systems such as these, the asymmetric distribution of magnetic force along the axis of rotation can lead to vibration at higher RPM. In implementation, the vibration can be mitigated by placement of counterweights on the rotating body. In additional or alternate implementations, vibration can be mitigated by using several similar arrangements (one next to the other) on a shared rotating body where each arrangement of coils or permanent magnets is at a different point in its acceleration curve from coil or permanent magnet located next to it.

In embodiments, rotational solenoid actuators configured to generate a nonuniform magnetic field gradient for the production of motion can comprise two coils of different polarity and/or winding direction, which are positioned near each other. This can allow for a permanent magnet or electromagnet to have each pole acting on or interacting with one of the two coils concurrently for more efficient force production through the simultaneous utilization of both magnetic poles. An exemplary embodiment of a form of winding for coils that produce a nonuniform magnetic field gradient along the diameter of a rotational linear actuator can be achieved via, for example, having multiple coil bobbins extending radially out of the actuator, which may be non-magnetic. Further, a coil can be wound such that two or more neighboring bobbins have a winding wrapped around them with a next winding wrapping around fewer bobbins than the preceding winding, until a winding is wrapped around a single bobbin. In embodiments, the progressive wrapping around fewer bobbins until reaching the single bobbin can be repeated one or more times with the same wire or an attached wire. This coil geometry can generate a nonuniform magnetic field that is progressively greater as it approaches the coil bobbin with the most windings around it and may act on one pole of a permanent or electromagnetic source. In embodiments, this form of coil may have a neighboring coil of the same geometry to act on the other pole of the permanent or electromagnetic source, which can, as discussed above, result in increased efficiency of the rotational linear actuator. This geometry is related to the embodiments of FIGS. 8A and 8B, as well as the exemplary rotational actuators of FIGS. 5A-5C.

FIGS. 5A-5C depict an exemplary embodiment of a rotational actuator apparatus 500, which is designed to actuate a rotating member 501. The rotating member 501 can be configured to rotate around a central axis of rotation 511 through the interaction of a first magnetic field around the rotating member 501 with a second magnetic field generated by a separate coil 507 when one or both of the first or second magnetic fields is a non-linear field gradient in the direction of rotation. In this embodiment, the magnetic field around the rotating member 501 is can be a source of a nonuniform magnetic field due to geometry of its coil 504. In implementations, the coil 504 is segmented in a configuration that can generate a peak magnetic flux density toward one end of the coil 504 and a minimum flux density on an opposite end thereof. The coil 504 can be connected to a power source 503 through connecting wires 504 and 504a. Similar to the rotation linear actuator described above, the coil 504 is wound around a plurality of bobbins 505a-505e so that a number of windings around the bobbin 505a is greater than the number of windings around the bobbin 505b. Further, a number of windings on each subsequent bobbin is less than the preceding bobbin (for example, the bobbin 505a has a great number of windings than the bobbin 505b, which has a greater number of windings than the bobbin 505c, which has a greater number of windings than the bobbin 505d, which has a greater number of windings than the bobbin 505e). This configuration results in a single coil (i.e., the coil 504) configured to generate an area of peak magnetic field density that is displaced relative to the center of the coil (i.e., towards one end of the coil 507). The separate coil 507 is connected to a power source 508 through a switch 509 (in FIG. 5A the switch 509 is shown in an open position 509a). The coil 507 can be configured to generate the second magnetic field for interaction with the first magnetic field generated by the rotating member 501 so as to rotate the member 501 towards a point (e.g., a position of 505a) where the peak magnetic field lines up with the stationary magnetic field of the coil 507. The side elevation view of FIG. 5B depicts a side view the rotational actuator apparatus 500 including an actuator 502.

FIG. 5B depicts a side view of the rotating member 501, illustrating the geometry of the coil 504. As can be seen therein, each consecutive winding is wrapped around on consecutive ones of the bobbins 505a-505e, thereby resulting in each winding being different distance from the first bobbin 505a. Further, the configuration results in the bobbin 505a having the most windings (the greatest number of windings) in contact therewith, and therefore is the location of greatest magnetic field density is in the area of the first bobbin 505a.

FIG. 5C depicts the rotating actuator 500 after the switch is moved to a closed position 509b causing rotation of the rotatably member 501. Specifically, the rotatable member 501 can be rotated such that the peak magnetic flux density (located at the bobbin 505a and corresponding to a magnetic north pole of the coil 504) is aligned with a magnetic south pole of the coil 507. The direction of rotation 512 about the central axis 511 depicts the movement that occurred after or when switch 509 is in a closed 509b.

In implementations, this embodiment can include a spring within the rotating member 501, which can enable actuation which returns an object to a predetermined position without switching the polarity of the coil 507. In such implementations, a distance of rotation of the rotating member 501 can be controlled (and varied) by selecting specified power levels that partially overcome the spring's tension, which may be selected via e.g., a controller apparatus (such as the computerized controller apparatus 1410 discussed below with reference to FIG. 14). Alternatively or additionally, the actuator 500 can include a flexible cable, which may be the moving object in the system. The flexibility of the cable allows for of the actuator to be used for various applications, especially those in which the flexibility is needed or beneficial. Examples of where flexibility may be beneficial may be where a moving object in the system needs to make a turn, such as in e.g., clothing or some robotic systems. In such instances, the flexible cable can form a non-linear central axis of actuation. An example of this would be the addition of a spiral spring to the actuator apparatus 500 of FIGS. 5A, 5B, and 5C. For example, a spiral spring may be rigidly mounted on a stationary member on one end and attached to the rotating actuator on the other. Turning off the power or reducing the average power may allow for the rotating object to completely or partially return to a predetermined position. Further, the spring may be designed to take the rotating member from the end of the actuation stroke to the beginning so that it may be acted upon by the coil without a polarity reversal being necessary.

In other implementations, the actuator 500 can be used in combination with hydraulic or pneumatic actuators to increase a force produced by the combined actuator and/or reliability of the combined actuator. For example, during use, strain may be lowered on one or more components of the system. In another example, one actuator may act as a backup to the other actuator in an instance where one fails.

In still other implementations, the actuator 500 can be used in voice coil actuators in conditions where an asymmetrical field density may be desirable. The asymmetrical field density actuator may be simpler to operate than a conventional voice coil type due to the ability to use DC from more simple power sources and to make the object or plunger in motion perform a variety of movements, such as omni and/or bi-directional movements. It may also be possible to produce the asymmetrical field density solenoid actuator in a lower cost manner than a typical voice coil., and/or in other applications related to vehicles, including in internal combustion engine valves, fluid pumps, fluid valves, oscillators, projectiles, automatic surface leveling, and/or in suspension systems. The form of the actuator may take that of the embodiments of FIGS. 2A and 2B.

The rotatable actuator 500 (as well as other actuators disclosed herein) may be more compact for use in a given application relative to conventional actuators. Further, the rotatable actuator 500 (as well as other actuators disclosed herein) may reduce a gap in time within which the object in motion receives little or no driving force (due to its position coinciding with either peak or minimum magnetic flux density) when there are multiple coils along a single axis. In contrast, in conventional actuators, an object or plunger can only travel in one direction and may be acted upon by multiple co-axial coils as the coils switch on and off as the object reaches the halfway point along the length of a respective coil. The asymmetrical field density design of the actuators disclosed herein may address these issues. In the embodiments of FIGS. 5A, 5B, and 5C, this would take the form of one or more additional coils similar to coil 507.

FIGS. 5A, 5B, and 5C can represent an embodiment of an axial flux actuator. Although this design of an axial flux actuator takes place around an axis of rotation, the same actuator can function in a linear motion application as well. This may be advantageous in applications where the plunger and the coils are not required to be constrained by the solenoid windings being wrapped around the outside of the plunger or with the plunger being positioned on top of the solenoid windings. It may also be advantageous to adopt this form of linear actuator when spatial constraints limit the length of the rigid or semi rigid piece which connects the object which needs motion imparted to it and the plunger of the actuator. This reduced spatial constraint is the result of the configuration of the coil windings. Further, both poles of permanent magnets may be used to act on both poles of the magnetic field produced by a coil wound in a manner similar to that of the embodiment of FIGS. 5A, 5B, and 5C.

In other embodiments, pulsed DC can be used in combination with actuators configured to disclosed herein for thermal management. Additionally, the actuators disclosed herein can be used in combination with housings having cooling systems embodied as metal vanes or hollow bodies containing the coil(s), which are equipped for cooling fluid being pumped therethrough.

The actuator, rotating joint, or motor may also have provisions for locking in place. This allows for no energy to be consumed when the actuator is holding a predetermined position.

It will be appreciated that the components of the actuators disclosed herein can be implemented in forms other than linear and rotational actuators. For example, other magnetic systems of force can may be configured to include features of the actuators disclosed herein in order to implement non-linearity which can aid in the duration of applied forces, as well as tailoring of the slope of the forces. Since each subsequently peripheral coil adds onto the field of the coil beneath it, a function of combined or additive forces (i.e., the sum of each of the individual coil's forces) may be formed by the system. As more non-linearity is introduced into a coil system design, the generated magnetic field and the subsequent force profiles follow suit.

Further, the profile of the non-linearity of flux potentials can be suited to the application for which the linear actuator (or another actuator) is required. For example, it will be appreciated that a certain function of flux density distributions may be especially well-suited to an application, and the distribution can take the form of the inverse square curve (i.e., $1/d^2$). Various other flux distribution patterns may be used where applications desire a particular profile of forces on an object or plunger in motion. A specific example of an application where this trait may be desirable or useful is with an object that must be made to resist certain strains as it is actuated, where these strains do not increase in a linear manner but are instead varying in an exponential manner over the stroke of actuation.

Another feature of disclosed herein can be gradual and successively greater acceleration that is experienced by a moving object or plunger. The successive accelerations progressively stacking up may yield a greater efficiency of force transference onto the object or plunger than a strong impulse of force of a constant amplitude. The added efficiency can be gained by the integral of the acceleration function being larger than a comparable coil. The reason for this increase in efficiency may at least in part be due to fact that the limits of the function of applied force are twice that of an ordinary coil since the object or plunger is capable of being acted upon for nearly twice the amount of time while it is within the primary coil.

In applications where optimum efficiency is desired, the linear actuators or other actuators disclosed herein can be provided with coils, which are wound in a bifilar fashion in such a way as to increase the field density of a coil for a given number of turns as is described, for example, in the U.S. Pat. No. 512,340, which is incorporated by reference herein. This can allow for less materials to be used in the creation of an actuator of a certain desired force. A further increase in efficiency can be made by distributing the field density in a manner that corresponds to the inverse square law, thereby imitating the natural magnetic field distribution of a permanent magnet.

Figure 7A:
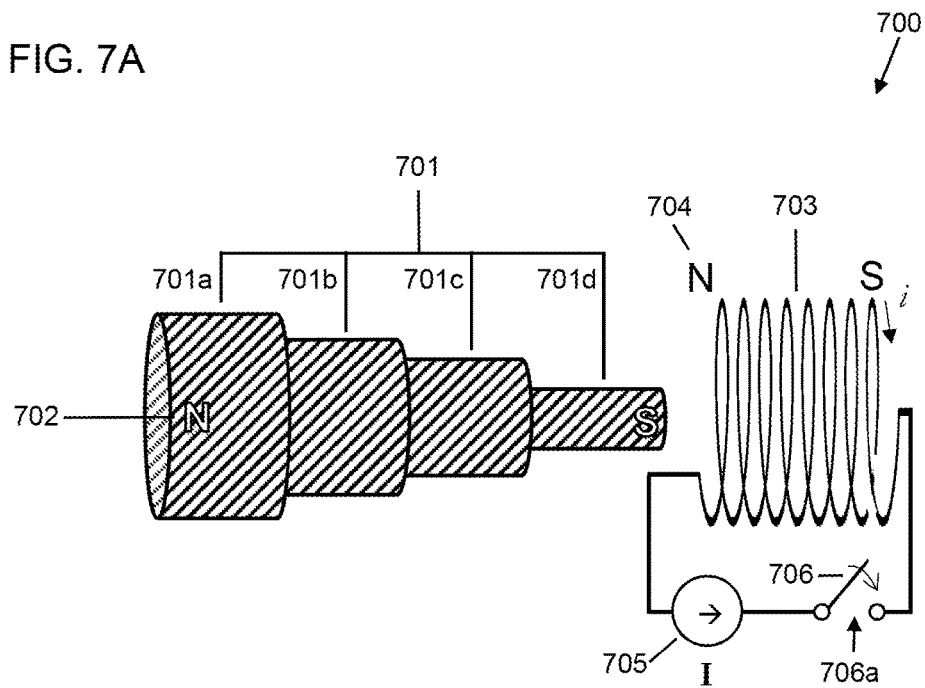
FIGS. 7A and 7B are schematic diagrams of another exemplary embodiment of a linear actuator, wherein concatenated permanent magnets of increasing field strength are utilized to produce an asymmetrical flux density, and a coil configured to, with electric current applied thereto, produce motion of either the permanent magnets or the coil itself, in accordance with the present disclosure.
Figure 7B:
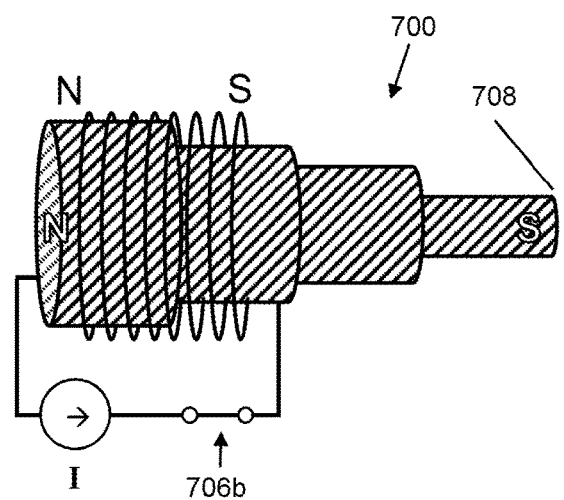

FIGS. 7A and 7B illustrate a linear actuator 700 that includes a magnet 701 (comprising of a series of permanent magnets 701a, 701b, 701c, 701d) configured to produce the asymmetrical flux density, wherein a coil 703 with electric potential is applied to the linear actuator 700 to produce motion of either the permanent magnets 701a, 701b, 701c, 701d or the coil 703 itself. As can be seen in FIG. 7A, the cylindrical permanent magnets 701a, 701b. 701c, 701d can each have a different diameter and connect together so as to form a single magnetic dipole. The variation in diameter can augment the magnetic flux density experienced by the coil 703 from the magnet 701 in such a way as to create a nonuniform magnetic field along its length. A circuit 705 in communication with a current source and a switch 706 can allow the stationary coil to act on the magnet 701 so as to produce a linear actuator with a wider stroke (relative to a conventional linear actuator) as a result of the augmented profile of the magnetic flux density along the permanent magnet's length.

FIG. 7A illustrates the switch # in a closed position 706, while FIG. 7B depicts the linear actuator 700 in a state where the switch 706 is in an open position 706a and is moved into a closed position 706b. When in the closed position 706b, power flowing through the coil can act upon the magnet 701 and causes them to move nearly the full length of the way down the coil 703. A South pole 708 of the magnet 701 can extend outwardly from front of the end of the coil 703 after the magnet 701 has moved its full stroke, and the North pole 702 can be aligned with the back end of the coil 703.

Without departing from the scope of the present disclosure, a toroidal coil could be used in the linear actuator 700, which may employ a core. The toroidal core may be beneficial when ultra-fast movement is desired, on account of the inherently higher quality factor, which make them predisposed to fast switching of polarity or power levels. Additionally, or alternatively, Litz wire may also be used to this end. The diagrammatic representation of this may not depart from the embodiment shown in FIGS. 7A and 7B, where the coil is a toroid instead of an ordinary solenoid.

In order to lower the weight and/or the cost of the linear actuator 700, the magnets 701a, 701b, 701c, 701d can be connected with iron rods, which may be hollow to create a virtually longer permanent magnet. Additionally or alternatively, electromagnetic solenoids can be used in place of the permanent magnets (with or without magnetizable cores). For example, the electromagnetic solenoids can be of classic construction or asymmetrically constructed to suit a particular force profile of the application. In implementations, longer life due to a lack of magnetic force deterioration found in permanent magnets may be provided at the expense of power consumption when EM solenoids are used in place of permanent magnets in the actuator 700.

Turning to FIGS. 8A and 8B, a linear actuator 800 is shown and described. In applications where precision of movement is desired, two coils may be used, which are oppositely magnetized. In such a configuration, the power of each coil can be biased so that one coil predominates using electric control systems capable of intelligent computation of movement and precise actuation of power (such as, the computerized controller apparatus 1410 discussed below with reference to FIG. 14). Such control systems are known use in screw type actuators. The coils can be on different axes of movement and can be connected together through a rigid or semi-rigid mechanism to prevent the distortion of their respective fields.

FIG. 8A the linear actuator 800 includes a first coil 820a comprising three sets of windings 801, 803, 805 on a first circuit and a second coil 820b comprising three sets of windings 802, 804, 806 on a second circuit, which are each disposed along a single axis 807 and configured to act on a plunger. Specifically, the first and second coils each consist of an inner winding 801, 802 that stretches the full length of the actuator 800, an intermediate winding 803, 804, and an end winding 805, 806. Two non-uniform magnetic fields can be created utilizing the linear actuator 800, which have their peak flux density at opposite sides of the coils. Each of them can act on a plunger in such a way that the coils push or pull on it simultaneously.

FIG. 8B shows the foregoing coils (circuits) 820a, 820b each connected to a power source 808, 809, and each with a potentiometer 810, 811, which can be used in the actuator 800 to augment the power flow of each coil. This can enable biasing of the forces acting on a plunger in order to augment the stopping position of the plunger along the stroke. As discussed above, each coil 820a, 820b consists of three sections or groups of windings, where, in addition to having different length, the sections of windings have different diameters relative to other sections in the coil, as each section of windings is wound over the previous group of windings. When the potentials of one or either coils 820a, 820b are augmented, it can cause the plunger(s) in motion to be attracted to one end or the opposing end of the actuator 800 in proportion to the ratio of flux density produced between the two coils. It will be understood that other configurations and/or methods of altering the flux density of one or both of the coils 820a, 820b may be used, such as including and utilizing a variable power source. In examples, a selected ratio of flux density can be used to control power delivery to one or both of the coils 820a, 820b via a controller apparatus (such as the computerized controller apparatus 1410 discussed below with reference to FIG. 14), which can be further utilized to control a position of the plunger(s). It will be further understood that the direction of winding of the coils and the manner of application of electric potential can be reversed without departing from the resulting motion that is produced.

It will be yet further understood that heat generated by a coil or coils in the linear actuator 800 (or other actuators disclosed herein) giving rise to nonuniform field distributions may be greater where the field densities are greatest. Accordingly, in implementations, enclosures for cooling fluid to flow through may be incorporated into the actuator. Similarly, in alternate or additional implementations, vanes can be used, which may be longer at the points of greatest field density, to aid in the cooling of the coil(s). Further, in additional or alternate implementations, watertight enclosures may be used for a given application. Pulse width modulation may be used to alter the position of the plunger through its application to one or both circuits.

In implementations, the linear actuator 800 (or other actuators disclosed herein) can be used for the gradual absorption of high impulse forces. A permanent magnet (plunger), which is made to move through a coil that includes progressively more or layered windings, may experience a progressively increasing reluctance to movement from the increasing back-EMF. This may be similar to compression of a spring except that the energy is not stored kinetically through tension, though it may be generated and stored electrically depending on the configuration of the impulse absorbing apparatus. For example, one configuration may have a coil actively resisting the motion using electromagnetic fields produced by a power source, whereas another configuration may have a passive coil where the permanent magnet encounters a greater back-EMF as it travels along the length of the coil containing more (or less) windings toward one pole or one end thereof. The latter configuration may provide an electrical generating potential and the former may provide greater force retardation of the moving plunger. High impulse forces may therefore be absorbed and the density of the windings along the coil can be tailored for gradual slowing of the plunger, which would otherwise experience a more rapid decrease in speed, and thereby lower the force impulse. Another example of impulse reduction may be a configuration where a coil with nonuniform flux density is energized and a soft iron bar (plunger) is imparted some force as it moves through the coil. In this example, the coil may resist the movement of the iron bar proportionally to the field at a given point. As the field is not linear, the force may experience a changing reluctance of movement, which may lower the impulse curve of the force on the bar. In implementations, multiple coils with variable power sources can be used to change the gradient of the magnetic field to further tailor the reluctance to the force imparted on the magnetized object (plunger) in real time. Further, the coils may be configured in a way in which an impact triggers a circuit to turn on through the physical shock or through the dislodging of an object that was breaking the circuit. Multiple such objects can be used for multiple circuits. The form of this embodiment may not depart from the form shown in FIGS. 2A and 2B.

This type of actuator may be particularly well-suited to applications where the force exerted on the actuator by a system is not constant. An example of this application includes, e.g., crushing of an object, stretching of an object with some degree of elasticity, and repelling of a magnetized object from a single pole of a coil system.

In implementations, the linear actuator 800 (or other actuators disclosed herein) can be used for the rapid movement and levitation of magnetized objects in space. For example, an object can be placed in a space surrounded by an actuator that produces a magnetic field, such as being placed in one or more coils. The coils can be turned on and off with a polarity and frequency corresponding to the object's position in space in such a way that the object is attracted to a denser magnetic field in the direction of the desired trajectory of the object. The object may be, for instance, a spherical magnetic object suspended against gravity with the north and south poles perpendicular to the pull of gravity. Multiple coils, which themselves may be comprised of one or more individual circuits for further fine tuning of the field density (as in, e.g., the exemplary embodiment of FIGS. 7A and 7B), are positioned around the object. As the spherical object fall towards the bottom of the actuator, a series of coils can produce fields that create a field density distribution that pulls both the north and south poles upwards. As the object rises, the coils can turn off, causing the object to crest and fall. When the field gradient is not parallel with the pull of the object, a spinning of the spherical object can occur and a subsequent wobble of the object on its axis would occur. Provided that there is some mechanism for keeping track of where the object is in space and where the poles are located, the forces from the coils can continue to keep the spherical object aloft. It will be understood that the object may be of any shape and it may be paramagnetic, electromagnetic, or contain permanent magnets. The magnets may have a desired distribution configured such that fields are created with a magnetic flux distribution pointed in the desired direction of travel.

In implementations, a computer can be utilized in combination with the linear actuator 800 (or other actuators disclosed herein) to predict the trajectory based on past or present locations and switch the power to the coils accordingly to move the object (or plunger) in an intelligent way. Further, in implementations, more than one object (or plunger) can be moved in this way provided that there is sufficient data collected from the moving objects. A predictive model can be found, which allows the computer to operate independently of real-time position centers provided it has the previous location data of an object. In examples, using this configuration multiple small objects can maintain an orbit around a central magnetized object. The central object can include, for example, multiple coils pointed in different directions radially outward, each with individual circuits attached to a computerized controller (such as e.g., a computerized controller apparatus 1410 discussed below with reference to FIG. 14). Coils on the periphery can act on the moving magnetized objects to maintain spatial orientation. In this type of actuator, a model of planetary motion can be made where elliptical orbits of the moving magnetized objects are brought about through the use of rapidly fluctuation magnetic fields with intelligently controlled field density altering the objects trajectory by creating denser fields in the desired direction of motion. Both attraction and repulsion can be used in such an actuator to cause the desired motion. The objective may be to minimize distortion of the respective trajectories by keeping the moving objects polarity aimed in the same direction throughout the course of movement. For example, a model of a liquid vortex can be applied to the computer's trajectory algorithm since a floating object dropped into a liquid vortex points the same direction continually as it swirls around the central axis.

Figure 13:
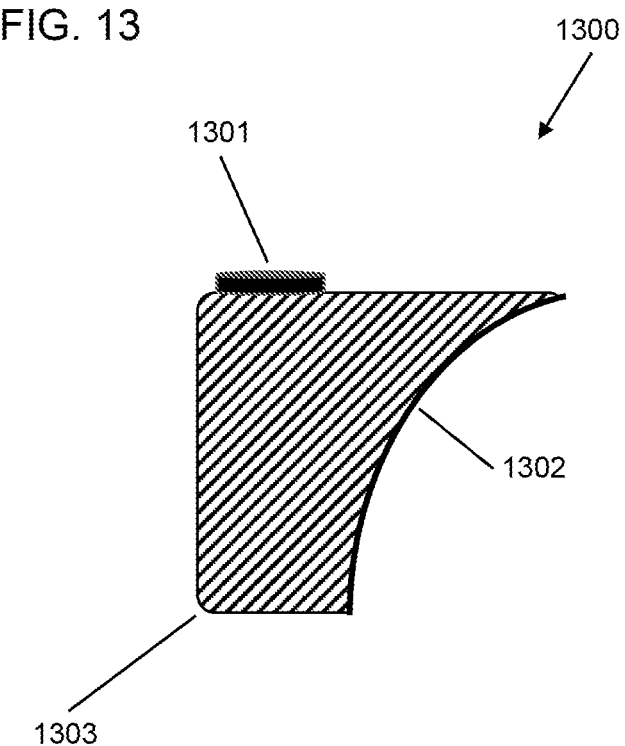
FIG. 13 is a schematic diagram of showing acceleration of ionized particles over a wider length due to a nonhomogeneous electric field, in accordance with the present disclosure.

In implementations, instead of using magnets in an actuator, which creates flux distributions to move objects intelligently in three dimensions, ionized particles and plasma may similarly be controlled. The electric field distribution may be augmented in such implementations. There may be little or no limit to color density and/or speed of movement other than the strength of the field at a given point in the designated space. For use with plasma, vacuum containers with a mechanism for augmenting the potential dynamically at a given point and to high flux levels may be utilized for the maximum adjustability. This configuration and method can be used in the acceleration of particles in, e.g., a particle accelerator. Sound waves may be incorporated to add another layer of control to these actuators by creating compression and rarefaction, which may influence the ionized particles density. An exemplary embodiment showing acceleration of ionized particles over a wider length due to a nonhomogeneous electric field is depicted in FIG. 13, discussed further below.

In implementations, the linear actuator 800 (or other actuators disclosed herein) can be used for extension of the length of a dielectric barrier discharge as, for example, in a plasma actuator. A dielectric barrier discharge can be increased in length by the application of nonlinear voltage distributions on a charged conductor that is sheathed under a dielectric barrier. Plasma actuators, which use a dielectric barrier discharge in order to, for example, influence fluid flow of the surrounding medium, can by this method extend the influence of the plasma on the fluid medium through the relatively longer length of travel, which the ionized plasma is made to be conveyed upon by the introduction of the field asymmetry. The configuration and method for producing the nonlinearity of the field in this example may be through the influence of mutual capacitance of a secondary source on the sheathed conductor. The mutual capacitance can cause a change in the charge distribution along a surface of a conductor and therefore a change in the voltage distribution along the conductor. The secondary source may provide a mutual capacitive influence over a small portion of the surface of the sheathed conductor when it is desirable to cause a change in the voltage distribution only over the small portion of the conductor. Multiple other voltage sources may be employed that may have different voltage levels when it is desired for the dielectric barrier discharge to have a particular or dynamic distribution of the plasma along the discharge axis. It will be appreciated that the mutual capacitance in the system, which produces the nonlinear field, may be a function of voltage and surface area, so either may be augmented to change the field distribution. This is shown in FIG. 13 where a plasma actuator 1300 is constructed of an upper electrode 1301 which is exposed to the flow of a fluid over its surface. A dielectric 1303 separates that electrode and a second electrode 1302 which is shaped so as to provide an increasing electric field density to the ionized particles traveling from the first electrode 1301 as they travel further over the surface of the dielectric. This can increase the effectiveness of the plasma actuator in acting on a fluid medium by widening the plasma actuators range of influence on the fluid body.

Alternatively, in implementations, one of the electrodes in the plasma actuator can have multiple sections of the conductor separated by the dielectric (as the exemplary embodiment in FIG. 5). Each of the conductors may have a separate voltage from a suitable high voltage source. The charge may be predominating in one direction. Accordingly, the dielectric barrier discharge may tend to redistribute its density to favor the direction of the higher voltage conductor. The benefits of this implementation may include the functioning of a dielectric barrier discharge plasma actuator at relatively lower fluid medium speeds and with relatively higher efficiency, both of which may be a result of the longer field of influence for a given plasma actuator. Further, it may be applied to the exterior of vehicles or aircraft to influence the drag coefficient more effectively through the creation of a larger field of influence of the discharge and through the acceleration of the ionized particles in the plasma toward the higher density voltage conductor. The extension of the plasma discharge can also be applied in other areas of industry, such as the sterilization of food and any other area where dielectric barrier discharges are used. This embodiment is similar in function to that depicted in FIG. 13 except that the curved electrode 1302 can be replaced with a flat electrode which is parallel with electrode 1301 and consists of multiple conductors of different potential in order to augment the electric field strength to increase the length the ionized particles travel. This also increases the effectiveness of the plasma actuator in acting on a fluid medium by widening the plasma actuators range of influence on the fluid body.

Figure 14:
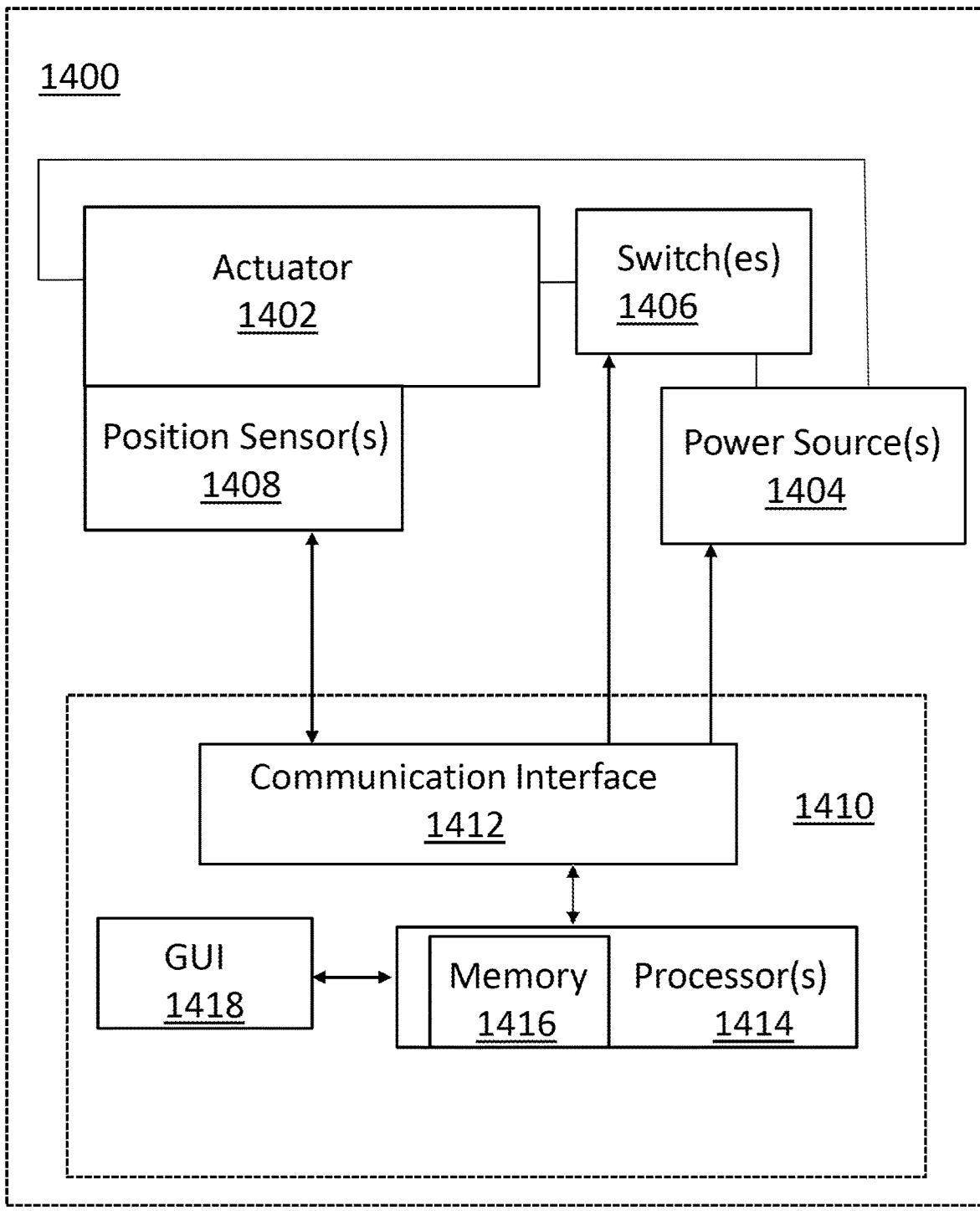
FIG. 14 is a logical block diagram of an exemplary actuator and controller system, in accordance with the present disclosure.

FIG. 14 shows an exemplary embodiment of an actuator and controller system 1400. As can be seen therein, in embodiments, the system 1400 can include a solenoid actuator 1402 (which can be any of the actuator embodiments and include any of the components thereof shown and described in FIGS. 2A-13). The actuator 1402 is on one more electrical circuits for communication with one or more power sources 1404 (such as, e.g., variable power sources), where closing and opening of the electrical circuits are respectively controlled by one or more switches 1406. The system 1400 can optionally include a position sensor(s) 1408 configured to sense or identify a position of one or more plunger(s) in the actuator 1402. Each of the switches 1406, the power sources 1404, and the position sensor 1408 can be in communication with one or more computerized controller apparatus 1410.

The computerized controller apparatus 1412 can include, for example, a communication interface 1412, one or more processors or microprocessors 1414 that comprise memory (or data storage apparatus) 1416, and/or a graphical user interface (GUI) 1418 configured to receive user input and/or display data to a user. The memory 1416 can store one or more computer programs therein including a plurality of computer-executable instructions for operating or controlling the actuator 1402 to perform the various operations and applications discussed above with reference to FIGS. 2A-13 and elsewhere herein.

In exemplary embodiments, the foregoing processors and/or microprocessors can include various types of digital processing devices including, without limitation, digital signal processors (DSPs), reduced instruction set computers (RISC), general-purpose (CISC) processors, microprocessors, gate arrays (e.g., FPGAs), PLDs, state machines, reconfigurable computer fabrics (RCFs), array processors, secure microprocessors, and application-specific integrated circuits (ASICs). Such digital processors may be contained on a single unitary integrated circuit (IC) die or distributed across multiple components. Further, in exemplary embodiments, the foregoing memory and storage devices can include various types of integrated circuit or other storage devices adapted for storing digital data including, without limitation, ROM, PROM, EEPROM, DRAM, SDRAM, DDR/2 SDRAM, EDO/FPMS, RLDRAM, SRAM, "flash" memory (e.g., NAND/NOR), 3D memory, and PSRAM. Furthermore, in exemplary embodiments, the foregoing communication interface can be a signal or data interface with a component or network including, without limitation, those of the FireWire (e.g., FW400, FW800, etc.), USB (e.g., USB 2.0, 3.0. OTG), Ethernet (e.g., 10/100, 10/100/1000 (Gigabit Ethernet), 10-Gig-E, etc.), MoCA, LTE/LTE-A, Wi-Fi (802.11), WiMAX (802.16), Z-wave, PAN (e.g., 802.15)/Zigbee, Bluetooth, Bluetooth Low Energy (BLE) or power line carrier (PLC) families.

Additional examples of the disclosed technology are enumerated below.

1. An improvement to the length of stroke of systems of force production through the use of magnetic fields through the introduction of non-linearity of the flux density along the length of the coil and along the length of a rod containing permanent magnets.

2. A method of displacing the point of centralized force within a coil or solenoid by changing the field density distribution.

3. An optimization of non-linear coil geometry for the application of the acceleration of a moving object by creating coils or the magnetic field of an apparatus in a non-linear shape.

4. A linear motion producing apparatus, which operates with the capability of a longer stroke through the displacement of the point at which the balance of magnetic forces is achieved on a moving object in the system with an application in linear actuators, linear motors, linear accelerators, mechanical oscillators, etc.

5. A method of tailoring the force profile in electromagnetic systems of motion including to motors, actuators, etc.

6. A system with a plurality of coils of asymmetrically oriented flux densities that are capable of individually biasing the electric power so as to allow precise actuation of a moving object. In this manner any desired direction, speed, or distance of stroke of the linear actuator may be provided.

7. A system comprising of variable magnetic density permanent magnets where an electromagnet or another permanent magnet is made to move along a relatively longer stroke.

8. A system in which the tailoring of the force on an object is attainable through the manipulation of field density over the stroke of said object, which may be non-linear, giving rise to non-linear acceleration profiles. These acceleration profiles and magnetic density profiles may advantageously include the inverse square curve, the hyperbolic curve, or a distribution that follows that of the Brachistochrone curve. The most efficient curve for force distribution is the curve that most closely represents that of the natural permanent magnet, which is the curve made by the inverse square law.

9. A system in which the function of the increase in magnetic field density of the coil system or the permanent magnets can be tailored to an application or altered for maximum efficiency.

10. Furthermore, the function of the increase in magnetic or electric field density of the coil system, permanent magnets, or electric charges can be tailored to an application or altered for maximum efficiency. The highest efficiency of operation would be given by a field in the shape of the curve of the inverse square law.

11. A system in which the non-linearity of the forces in a system of a linear or rotational actuator comprising of non-uniform magnetic fields can be altered by the introduction of a source of tension (a rubber band, for example).

12. A system in which many additional systems of force can be attached to the moving and stationary member(s) of a nonuniform field distribution actuator using rigid or semi-rigid means.

13. A system of movement, which can comprise a system of nonuniform field distributions using no permanent magnets at all when a plurality of electromagnetic coils are used.

14. A system comprising of one or more coils, magnets, electrostatic, or other sources of high electric potential with asymmetrically distributed flux fields that can be incapsulated in an air or watertight enclosure, without departing from the scope of the disclosed technology.

15. A system of non-linear flux density that can be made without using standard circular coil windings, and motion can be made to occur on any other object, which acts on or is acted upon by a magnetic field.

16. Without departing largely from the scope of the disclosed technology, the electromagnetic coils and permanent magnets can be replaced by electrostatic potentials with elements comprised of increasing flux densities on one direction, which can be acted upon by an object with an electrostatic charge or bias including electrets and charged conductors.

17. A system that possesses asymmetrically dense flux fields, which can act in either attraction or repulsion in order to provide movement or actuation.

18. A system in which a linear actuator or linear motor may have one moving part that travels nearly the full length of the actuating coil, reducing the redundant space of a common solenoid or voice coil, thereby offering the possibility to do away with multiple moving parts.

19. A system where multiple permanent magnets of the same size and flux density may be used in an ordinary geometry electromagnetic coil by altering the distance of the permanent magnets to the coil in use over the axis of the object to be set in motion.

20. A linear actuator comprising: a plunger, one or more first coil members circumscribing a central axis, wherein the one or more first coil members are configured to produce a first asymmetrical field distribution having a greater flux density at a first end of the linear actuator, and one or more second coil members circumscribing the central axis, wherein the one or more second coil members are configured to produce a second asymmetrical field distribution having a greater flux density at a second opposing end of the linear actuator, wherein the one or more first coil members and the one or more second coil members are further configured such that the each of first asymmetrical flux density and the second asymmetrical flux density is independently controllable to cause motion of the plunger along the central axis relative to the one or more first coil members and the one or more second coil members.

21. A linear actuator according to any of the examples disclosed herein, wherein the one or more first coil members comprises a first coil on a first circuit, the first coil comprising two or more sections of first windings, each of the two or more sections of first windings at least partially radially overlapping with an adjacent section of first windings, the two or more sections of first windings configured such that there is a greater number of overlapping first windings distributed toward the first end of the linear actuator relative to a center of the linear actuator.

22. A linear actuator according to any of the examples disclosed herein, wherein the one or more second coil members comprises a second coil on a second circuit, the second coil comprising two or more sections of second windings, each of the two or more sections of second windings at least partially radially overlapping with an adjacent section of second windings, the two or more sections of second windings configured such that there is a greater number of overlapping second windings distributed toward the second opposing end of the linear actuator relative to a center of the linear actuator.

23. A linear actuator according to any of the examples disclosed herein, wherein the one or more first coil members comprises a plurality of first coil members each on a separate circuit, wherein each first coil member comprises a portion of first windings that radially overlaps with an adjacent first coil member, the plurality of first coil members configured such that there is a greater number of overlapping first windings distributed toward the first end of the linear actuator relative to a center of the linear actuator.

24. A linear actuator according to any of the examples disclosed herein, wherein the one or more second coil members comprises a plurality of second coil members each on a separate circuit, wherein each second coil member comprises a portion of second windings that radially overlaps with an adjacent second coil member, the plurality of second coil members configured such that there is a greater number of overlapping second windings distributed toward the second opposing end of the linear actuator relative to a center of the linear actuator.

25. A linear actuator according to any of the examples disclosed herein, wherein the one or more first coil members and the one or more second coil members are further configured such that the each of first asymmetrical flux density and the second asymmetrical flux density are independently controllable to stop motion of the plunger along the central axis relative to the one or more first coil members and the one or more second coil members.

26. A linear actuator according to any of the examples disclosed herein, further comprising a first variable power source in communication with the one or more first coil members, and a second variable power source in communication with the one or more second coil members.

27. A linear actuator according to any of the examples disclosed herein, wherein the linear actuator is configured for communication with a controller, the controller in communication with and configured to control power from a first variable power source to the one or more first coil members for production of the first asymmetrical field density and control power from a second variable power source to the one or more second coil members for production of the second asymmetrical field density.

28. A linear actuator according to any of the examples disclosed herein, wherein the linear actuator is configured to be controlled such that, when more power is applied to the one or more first coil members relative to the one or more second coil members, the first asymmetrical flux density acts on the plunger to result in at least one of movement of the plunger toward the first end of the linear actuator or retarding movement of the plunger toward the second opposing end of the linear actuator.

29. A linear actuator according to any of the examples disclosed herein, wherein the linear actuator is configured to be controlled such that, controlling a ratio of flux density of the first asymmetrical flux density relative to the second asymmetrical flux density results in control of one or more of a speed of the plunger moving along the central axis, a position of the plunger on the central axis, a direction of movement of the plunger along the central axis, or a stroke length of the plunger along the central axis.

30. A linear actuator comprising: one or more first coil members circumscribing a central axis, and a plunger disposed at least partially within the one or more first coil members, wherein the one or more first coil members are configured to produce a first asymmetrical field distribution having a first peak density toward a first end of the linear actuator, and wherein the first asymmetrical field distribution is configured to have an increased maximum stroke length of the plunger along the central axis relative to a coil having symmetrical field density and a same length as the one or more first coil members.

31. A linear actuator according to any of the examples disclosed herein, wherein the one or more first coil members comprises a plurality of first coil members each on a separate circuit, wherein each first coil member comprises a portion of first windings that radially overlaps with an adjacent first coil member, the plurality of first coil members configured such that there is a greater number of overlapping first windings distributed toward the first end of the linear actuator.

32. A linear actuator according to any of the examples disclosed herein, wherein the linear actuator is configured such that a polarity of each of the one or more first coil members is independently controllable relative to others of the one or more first coil members.

33. A linear actuator according to any of the examples disclosed herein, further comprising one or more second coils members circumscribing the central axis, the one or more second coil members arranged to have a greater coil density at the second opposing end of the linear actuator relative to a center of the linear actuator, wherein the one or more second coil members are configured to produce a second asymmetrical field distribution having a second peak density toward the second opposing end of the linear actuator.

34. A linear actuator according to any of the examples disclosed herein, wherein the linear actuator is configured for communication with a controller, the controller configured to control a ratio of flux density between the first asymmetrical field distribution and the second asymmetrical field distribution to control one or more of a speed of the plunger moving along the central axis, a position of the plunger on the central axis, a direction of movement of the plunger along the central axis, or a stroke length of the plunger along the central axis.

35. A linear actuator comprising: a plunger; one or more first coil members circumscribing a central axis and comprising a greater number of overlapping windings at a first end of the linear actuator relative to a center of the linear actuator, wherein the one or more first coil members are configured to generate a first asymmetrical field distribution having a greater flux density at the first end of the linear actuator; a first variable power source in communication with at least one of the one or more first coil members; one or more second coil members circumscribing the central axis and comprising a greater number of overlapping windings at a second opposing end of the linear actuator relative to the center of the liner actuator, wherein the one or more second coil members are configured to generate a second asymmetrical field distribution having a greater flux density at the second opposing end of the linear actuator; and a second variable power source in communication with at least one of the one or more first coil members; wherein the one or more first coil members and the one or more second coil members are further configured such that one or more of a speed of the plunger moving along the central axis, a position of the plunger on the central axis, a direction of movement of the plunger along the central axis, or a stroke length of the plunger along the central axis is controlled via a ratio of flux density between the first asymmetrical field distribution and the second asymmetrical field distribution.

36. A linear actuator according to any of the examples disclosed herein, wherein the linear actuator is configured for communication with a controller, the controller in communication with and configured to control power from the first variable power source to the one or more first coil members for production of the first asymmetrical field density and control power from the second variable power source to the one or more second coil members for production of the second asymmetrical field density.

37. A linear actuator according to any of the examples disclosed herein, wherein the plunger comprises two or more plunger segments each connected to an adjacent plunger segment by a connection member.

38. A method of operating a linear actuator, the linear actuator comprising a plunger, one or more first coil members circumscribing a central axis and comprising a greater number of overlapping windings at a first end of the linear actuator relative to a center of the linear actuator, and one or more second coil members circumscribing the central axis and comprising a greater number of overlapping windings at a second opposing end of the linear actuator relative to the center of the liner actuator, the method comprising: controlling power from a first variable power source to the one or more first coil members, the one or more first coil members configured to generate a first asymmetrical field distribution; and controlling power from a second variable power source to the one or more second coil members, the one or more second coil members configured to generate a second asymmetrical field distribution; wherein the controlling of power from the first variable power source and the controlling of power from the second variable power source comprises generating a specified ratio of flux density between the first asymmetrical flux density and the second asymmetrical flux density, the specified ratio of flux density configured to result in one or more of a specified speed of the plunger moving along the central axis, a specified position of the plunger on the central axis, a specified direction of movement of the plunger along the central axis, or a specified stroke length of the plunger along the central axis.

39. A computerized controller configured for communication with a linear actuator, the linear actuator comprising a plunger, one or more first coil members circumscribing a central axis and comprising a greater number of overlapping windings at a first end of the linear actuator relative to a center of the linear actuator, and one or more second coil members circumscribing the central axis and comprising a greater number of overlapping windings at a second opposing end of the linear actuator relative to the center of the liner actuator, the one or more first coil members configured to generate a first asymmetrical flux density, and the one or more second coil members configured to generate a second asymmetrical flux density, the computerized controller comprising: a communication interface configured for communication with each of a first variable power source for providing power to the one or more first coil members and a second variable power source for providing power to the one or more second coil members; one or more processor apparatus; one or more storage apparatus in communication with the one or more processor apparatus, the one or more storage apparatus comprising non-transitory memory storing a plurality of computer-readable instructions therein, the plurality of computer-readable instructions configured to, when executed by the one or more processor apparatus, cause the computerized controller to: identify a specified ratio of flux density between the first asymmetrical flux density and the second asymmetrical flux density; control, based at least in part on the specified ratio of flux density, power flow from the first variable power source to the one or more first coil members; and control, based at least in part on the specified ratio of flux density, power flow from the second variable power source to the one or more second coil members; wherein, when the control of the power flow from the first variable power source and the control of the power flow from the second variable power source comprises causing more power to be applied to the one or more first coil members relative to the one or more second coil members, the first asymmetrical flux density acts on the plunger to result in at least one of movement of the plunger toward the first end of the linear actuator or retarding of movement of the plunger toward the second opposing end of the linear actuator; and wherein, when the control of the power flow from the first variable power source and the control of the power flow from the second variable power source comprises causing more power to be applied to the one or more second coil members relative to the one or more first coil members, the second asymmetrical flux density acts on the plunger to result in at least one of movement of the plunger toward the second opposing end of the linear actuator or retarding of movement of the plunger toward the first end of the linear actuator.

Any feature(s) of any example(s) disclosed herein can be combined with or isolated from any feature(s) of any example(s) disclosed herein, unless otherwise stated. Further, in view of the many possible embodiments to which the principles of the disclosure may be applied, it should be recognized that the illustrated embodiments are only examples and should not be taken as limiting the scope of the disclosed subject matter or the claims.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A magnetic actuator comprising:
one or more coil members configured to generate an asymmetrical field distribution; and
a moveable object, wherein the magnetic actuator is configured such that one or more of a position of the moveable object, a speed of the moveable object, or a direction of movement of the moveable object is controllable based at least on the generation of the asymmetrical field distribution;
wherein the moveable object comprises a rotatable member configured to rotate around a central axis of rotation;
wherein the rotatable member comprises a set of bobbins attached thereto, and wherein the one or more coil members comprise a first coil member, the first coil member comprising a plurality of windings wound on the set of bobbins;
wherein the set of bobbins comprises a first bobbin, and wherein the windings circumscribe an axis at the first bobbin; and
wherein the set of bobbins have a linear arrangement over a surface of the rotatable member, and each additional bobbin in the set of bobbins has progressively fewer windings wound thereon relative to a preceding bobbin the farther the additional bobbin is from the first bobbin.

2. The magnetic actuator of claim 1, wherein the magnetic actuator is further configured, based at least on generation of the asymmetrical field distribution, to have an increased maximum stroke length of the moveable object relative to a coil configured to produce a symmetrical field distribution and having at least one same dimension as the one or more coil members.

3. The magnetic actuator of claim 1, further comprising a first power source configured for communication with the first coil member, wherein, when the first power source applies power to the first coil member, the asymmetrical field distribution is generated and a location of a peak magnetic flux density thereof corresponds to a region of the first bobbin.

4. The magnetic actuator of claim 1, further comprising a second coil member, wherein the second coil member is configured to, when power is applied thereto, generate a second magnetic field for interaction with the asymmetrical field distribution generated by the first coil member, the interaction resulting in rotation of the rotatable member in a first direction such that the location of peak magnetic flux density of the first coil member moves toward or away from the second coil member depending on a polarity of the second coil member.

5. The magnetic actuator of claim 4, wherein the rotatable member comprises a spring member, wherein the spring member is configured to cause rotation of the rotatable member in a second opposing direction when power flow to the second coil member is decreased below a threshold.

6. A method of operating a magnetic actuator, the method comprising:
providing power to one or more coil members of the magnetic actuator, and thereby generating an asymmetrical field distribution; and
controlling one or more of movement or a position of a moveable object via the generating of the asymmetrical field distribution;
wherein the moveable object comprises a rotatable member comprising a set of bobbins linearly arranged over a surface thereof;
wherein the one or more coil members comprises a first coil member, the first coil member comprising a plurality of windings wound on the set of bobbins such that the windings circumscribe a first bobbin and each additional bobbin in the set of bobbins has progressively fewer windings wound thereon the further the additional bobbin is from the first bobbin;
wherein the generating the asymmetrical field distribution comprises generating a peak flux density in an area corresponding to a location of the first bobbin; and
wherein the controlling the movement of the moveable object comprises causing rotation of the rotatable object such that the area of the peak magnetic field density is moved toward or away from an external magnetic field source depending on a polarity of the second spring member.

7. A magnetic actuator comprising:
one or more coil members configured to generate an asymmetrical field distribution; and
a moveable object, wherein the magnetic actuator is configured such that one or more of a position of the moveable object, a speed of the moveable object, or a direction of movement of the moveable object is controllable based at least on the generation of the asymmetrical field distribution;
wherein the moveable object comprises a first magnetic plunger coupled to a second magnetic plunger via a connecting member, wherein the one or more coil members comprise a first coil member and a second coil member, the first coil member comprising a plurality of first windings circumscribing a first axis and the second coil member comprising a plurality of second windings circumscribing a second axis, and wherein the first magnetic plunger is configured for movement along the first axis and the second magnetic plunger is configured for movement along the second axis.

8. The magnetic actuator of claim 7, wherein the first coil member comprises greater number of overlapping first windings distributed toward a first end region of the magnetic actuator relative to a second opposing end of the of the magnetic actuator and is configured to generate a first peak flux density at the first end region of the magnetic actuator, and wherein the second coil member comprises greater number of overlapping second windings distributed toward the second opposing end region of the magnetic actuator and is configured to generate a second peak flux density in at the second opposing end region of the magnetic actuator.

9. The magnetic actuator of claim 7, further comprising a first power source in communication with the first coil member and a second power source in communication with the second coil member, wherein the magnetic actuator is configured such that an average power supplied by the first power source to the first coil member and an average power supplied by the second power source to the second coil member are each controllable for controlling the one or more of a position of the moveable object, a speed of the moveable object, or a direction of movement of the moveable object.

10. A magnetic actuator comprising:
one or more coil members configured to generate an asymmetrical field distribution, wherein the one or more coil members comprise a first coil member circumscribing an axis and having three or more taps along a length of the first coil member, each of the three or more taps in communication with a section of the first coil member and configured to enable provision of a flow of power to a respective portion of the first coil member;

a moveable object, wherein the magnetic actuator is configured such that one or more of a position of the moveable object, a speed of the moveable object, or a direction of movement of the moveable object is controllable based at least on the generation of the asymmetrical field distribution; and two or more power sources, wherein each of the two or more power sources is in communication with a pair of adjacent taps of the three or more taps and is configured to provide power to the respective section of the first coil member in communication with the pair of adjacent taps.

11. The magnetic actuator of claim 10, wherein the magnetic actuator is configured to enable a first one of the two or more power sources to provide a greater amount of power on average relative to a second one of the two or more power sources in order to generate the asymmetrical field distribution.

12. A method of operating a magnetic actuator, the method comprising:

providing power to one or more coil members of the magnetic actuator, and thereby generating an asymmetrical field distribution; and controlling one or more of movement or a position of a moveable object via the generating of the asymmetrical field distribution;

wherein the moveable object comprises a first magnetic plunger coupled to a second magnetic plunger via a connecting member;

wherein the one or more coil members comprise a first coil member and a second coil member, the first coil member comprising a plurality of first windings circumscribing a first axis and the second coil member comprising a plurality of second windings circumscribing a second axis;

wherein the generating the asymmetrical field distribution comprises generating a first asymmetrical field distribution at the first coil member and generating a second asymmetrical field distribution at the second coil member; and wherein the controlling movement of the moveable object comprises controlling movement of the first magnetic plunger along the first axis and controlling movement of the second magnetic plunger along the second axis.

13. A method of operating a magnetic actuator, the method comprising:

providing power to one or more coil members of the magnetic actuator, and thereby generating an asymmetrical field distribution; and controlling one or more of movement or a position of a moveable object via the generating of the asymmetrical field distribution;

wherein the one or more coil members comprise a first coil member having three or more taps along a length of the first coil member, each of the three or more taps configured to enable flow of power to a respective section of the first coil member, and wherein the magnetic actuator further comprises two or more power sources;

wherein each of the two or more power sources is in communication with a pair of adjacent taps in the three or more taps and is configured to provide power to a respective portion of the first coil member in communication with the pair of adjacent taps; and wherein the providing power to the one or more coil members of the magnetic actuator comprises providing a greater amount of power on average from a first one of the two or more power sources relative to a second one of the two or more power sources.

* * * * *